United States Patent
Kasslin et al.

(10) Patent No.: US 9,380,119 B2
(45) Date of Patent: *Jun. 28, 2016

(54) METHOD, APPARATUS, AND COMPUTER PROGRAM PRODUCT FOR NETWORK DISCOVERY

(71) Applicant: Nokia Corporation, Espoo (FI)

(72) Inventors: Mika Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 160 days.

This patent is subject to a terminal disclaimer.

(21) Appl. No.: 14/107,337

(22) Filed: Dec. 16, 2013

(65) Prior Publication Data

US 2015/0172391 A1    Jun. 18, 2015

(51) Int. Cl.
| | |
|---|---|
| *H04L 29/08* | (2006.01) |
| *H04W 4/00* | (2009.01) |
| *H04W 8/00* | (2009.01) |
| *H04W 52/02* | (2009.01) |
| H04W 84/18 | (2009.01) |
| H04W 84/20 | (2009.01) |

(52) U.S. Cl.
CPC ............... *H04L 67/16* (2013.01); *H04W 4/008* (2013.01); *H04W 8/005* (2013.01); *H04W 52/0229* (2013.01); *H04W 52/0235* (2013.01); *H04W 84/18* (2013.01); *H04W 84/20* (2013.01)

(58) Field of Classification Search
CPC ..... H04W 4/008; H04W 4/206; H04W 8/005; H04W 48/08–48/16; H04L 61/35
See application file for complete search history.

(56) References Cited

U.S. PATENT DOCUMENTS

| | | |
|---|---|---|
| 5,844,900 A | 12/1998 | Hong et al. |
| 6,292,508 B1 | 9/2001 | Hong et al. |
| 6,466,608 B1 | 10/2002 | Hong et al. |
| 6,842,460 B1 | 1/2005 | Olkkonen et al. |

(Continued)

FOREIGN PATENT DOCUMENTS

| | | |
|---|---|---|
| EP | 2400714 | 12/2011 |
| EP | 2587848 | 5/2013 |

(Continued)

OTHER PUBLICATIONS

Bluetooth Specification Version 4.1, Dec. 3, 2013.

(Continued)

*Primary Examiner* — Pao Sinkantarakorn
(74) *Attorney, Agent, or Firm* — Locke Lord LLP

(57) ABSTRACT

Embodiments enable discovery of networks in a wireless communications medium. In example embodiments, a method comprises inserting, by an apparatus, an indication associated with a neighbor awareness network to be advertised to an apparatus address field of a wireless advertisement packet; and transmitting, by the apparatus, the wireless advertisement packet including the inserted indication associated with the neighbor awareness network to be advertised. The packet may be a Bluetooth Low Energy ADV_IND PDU packet or a Bluetooth Low Energy ADV_SCAN_IND PDU packet. The apparatus's address field may be a non-resolvable private address format in an AdvA field of either the Bluetooth Low Energy ADV_IND PDU packet or the Bluetooth Low Energy ADV_SCAN_IND PDU packet. The apparatus may be operating in a Neighbor Awareness Networking (NAN) network or intending to operate in a NAN network.

18 Claims, 18 Drawing Sheets

(56) References Cited

U.S. PATENT DOCUMENTS

| | | |
|---|---|---|
| 7,809,835 B2 | 10/2010 | Reunamaki et al. |
| 8,571,519 B2 | 10/2013 | Ginzboorg |
| 8,879,992 B2 | 11/2014 | Kneckt et al. |
| 8,996,030 B2 | 3/2015 | Grainger et al. |
| 2002/0044549 A1 | 4/2002 | Johansson et al. |
| 2004/0221046 A1 | 11/2004 | Heinonen et al. |
| 2005/0185660 A1 | 8/2005 | Ekberg et al. |
| 2007/0086424 A1 | 4/2007 | Calcev et al. |
| 2008/0253327 A1 | 10/2008 | Kohvakka et al. |
| 2009/0215457 A1 | 8/2009 | Wang et al. |
| 2009/0234950 A1 | 9/2009 | Wikman et al. |
| 2009/0313310 A1 | 12/2009 | Thome et al. |
| 2010/0113042 A1 | 5/2010 | Kasslin et al. |
| 2010/0165875 A1 | 7/2010 | Kneckt et al. |
| 2010/0226297 A1 | 9/2010 | Kasslin et al. |
| 2010/0260067 A1 | 10/2010 | Palin et al. |
| 2010/0274874 A1 | 10/2010 | Reunamaki |
| 2010/0304759 A1 | 12/2010 | Leppanen et al. |
| 2011/0021142 A1 | 1/2011 | Desai et al. |
| 2011/0223937 A1 | 9/2011 | Leppanen et al. |
| 2012/0099476 A1 | 4/2012 | Mahaffy et al. |
| 2012/0115512 A1 | 5/2012 | Grainger et al. |
| 2012/0176941 A1 | 7/2012 | Bata et al. |
| 2012/0239248 A1 | 9/2012 | Bobbitt |
| 2012/0257543 A1 | 10/2012 | Baum et al. |
| 2012/0257561 A1 | 10/2012 | Redding |
| 2013/0072248 A1 | 3/2013 | Bajko |
| 2013/0090061 A1 | 4/2013 | Linde |
| 2013/0109313 A1 | 5/2013 | Kneckt et al. |
| 2013/0109314 A1 | 5/2013 | Kneckt et al. |
| 2013/0178163 A1 | 7/2013 | Wang |
| 2013/0201915 A1 | 8/2013 | Wang |
| 2013/0217333 A1 | 8/2013 | Sprigg et al. |
| 2013/0260693 A1 | 10/2013 | Un et al. |
| 2013/0326495 A1 | 12/2013 | Reunamaki et al. |
| 2014/0160978 A1 | 6/2014 | Palin et al. |
| 2014/0222574 A1 | 8/2014 | Emigh et al. |
| 2014/0233406 A1 | 8/2014 | Chhabra et al. |
| 2014/0269658 A1 | 9/2014 | Sadasivam et al. |
| 2014/0274031 A1 | 9/2014 | Menendez |
| 2014/0313966 A1* | 10/2014 | Shukla et al. ............... 370/312 |
| 2014/0323048 A1 | 10/2014 | Kang |
| 2014/0342670 A1 | 11/2014 | Kang et al. |
| 2014/0351832 A1 | 11/2014 | Cho et al. |
| 2014/0357192 A1 | 12/2014 | Azogui et al. |
| 2014/0358666 A1 | 12/2014 | Baghaie et al. |
| 2014/0362728 A1 | 12/2014 | Krochmal et al. |
| 2014/0378058 A1 | 12/2014 | Decuir et al. |
| 2015/0012660 A1 | 1/2015 | Kuulusa |
| 2015/0029341 A1 | 1/2015 | Sinha |
| 2015/0055507 A1 | 2/2015 | Korhonen et al. |
| 2015/0058409 A1 | 2/2015 | Wang |
| 2015/0073980 A1 | 3/2015 | Griffin et al. |
| 2015/0079942 A1 | 3/2015 | Kostka et al. |
| 2015/0082404 A1 | 3/2015 | Goldstein |
| 2015/0095456 A1 | 4/2015 | Shah et al. |
| 2015/0099467 A1 | 4/2015 | Kang |
| 2015/0109981 A1* | 4/2015 | Patil et al. ............... 370/311 |
| 2015/0172901 A1 | 6/2015 | Kasslin |

FOREIGN PATENT DOCUMENTS

| | | |
|---|---|---|
| EP | 2587849 | 5/2013 |
| EP | 2615869 | 7/2013 |
| WO | WO2013066938 | 5/2013 |

OTHER PUBLICATIONS

Stephen McCann; IEEE P802.11 Wireless LANs Liaison to Wi-Fi Alliance regarding IEEE 802.11aq PAR; IEEE Draft; DOC5ADN7UCNFF, IEEE-SA Piscataway, NJ, USA, vol. 802. secmail, Nov. 14, 2012, pp. 1-2.

Extended European Search Report for EP Application No. 14190193.4-1954 dated Jun. 4, 2015.

Extended European Search report for Application No. 14192596.6-1853 / 2884776 dated Jun. 12, 2015.

Extended European Search Report for Application No. 14191999.3-1870 dated Mar. 25, 2015.

"Link Layer Specifications—Core System Package", Bluetooth SIG web page, Jun. 30, 2010, pp. 2-87.

* cited by examiner

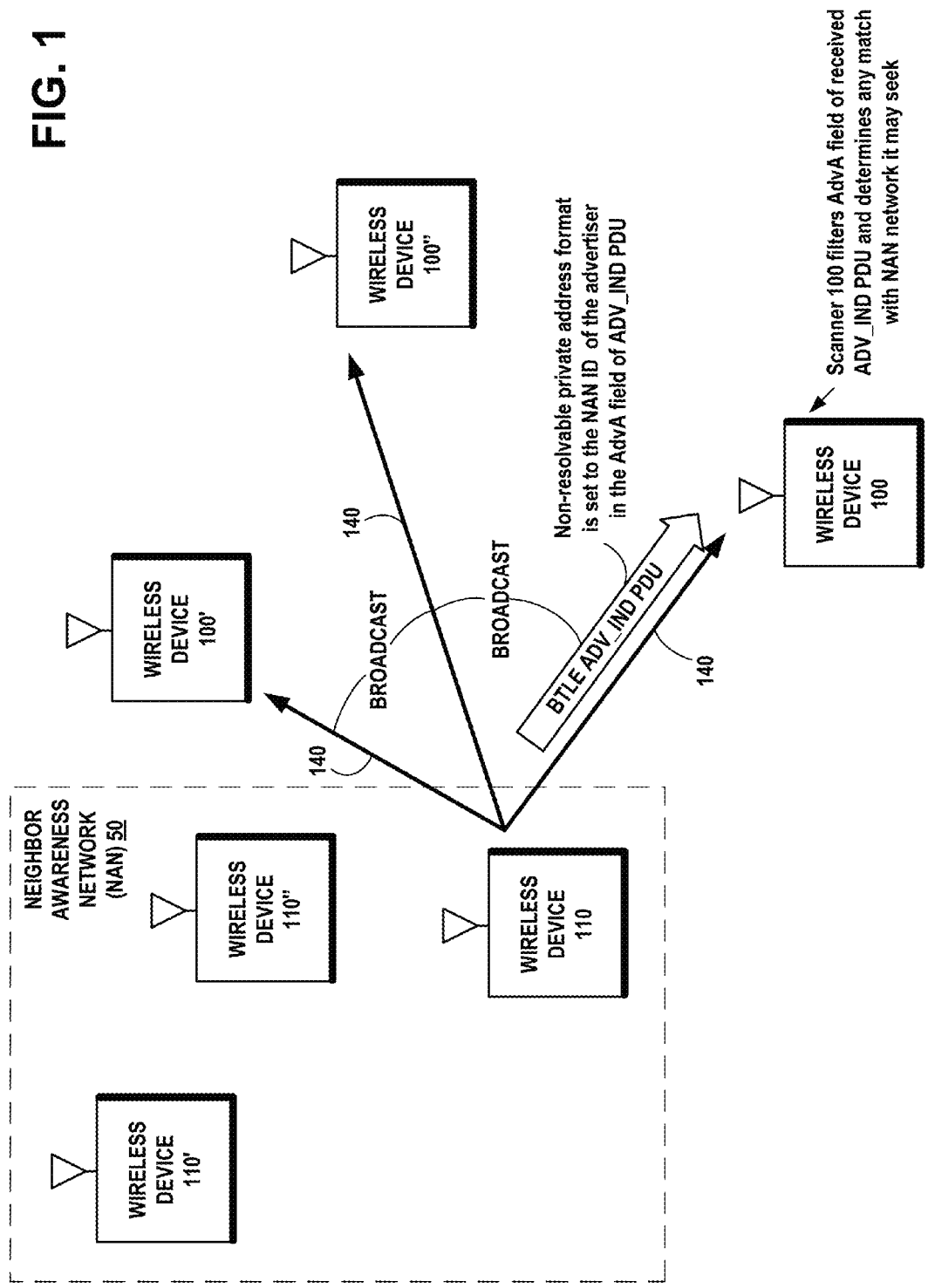

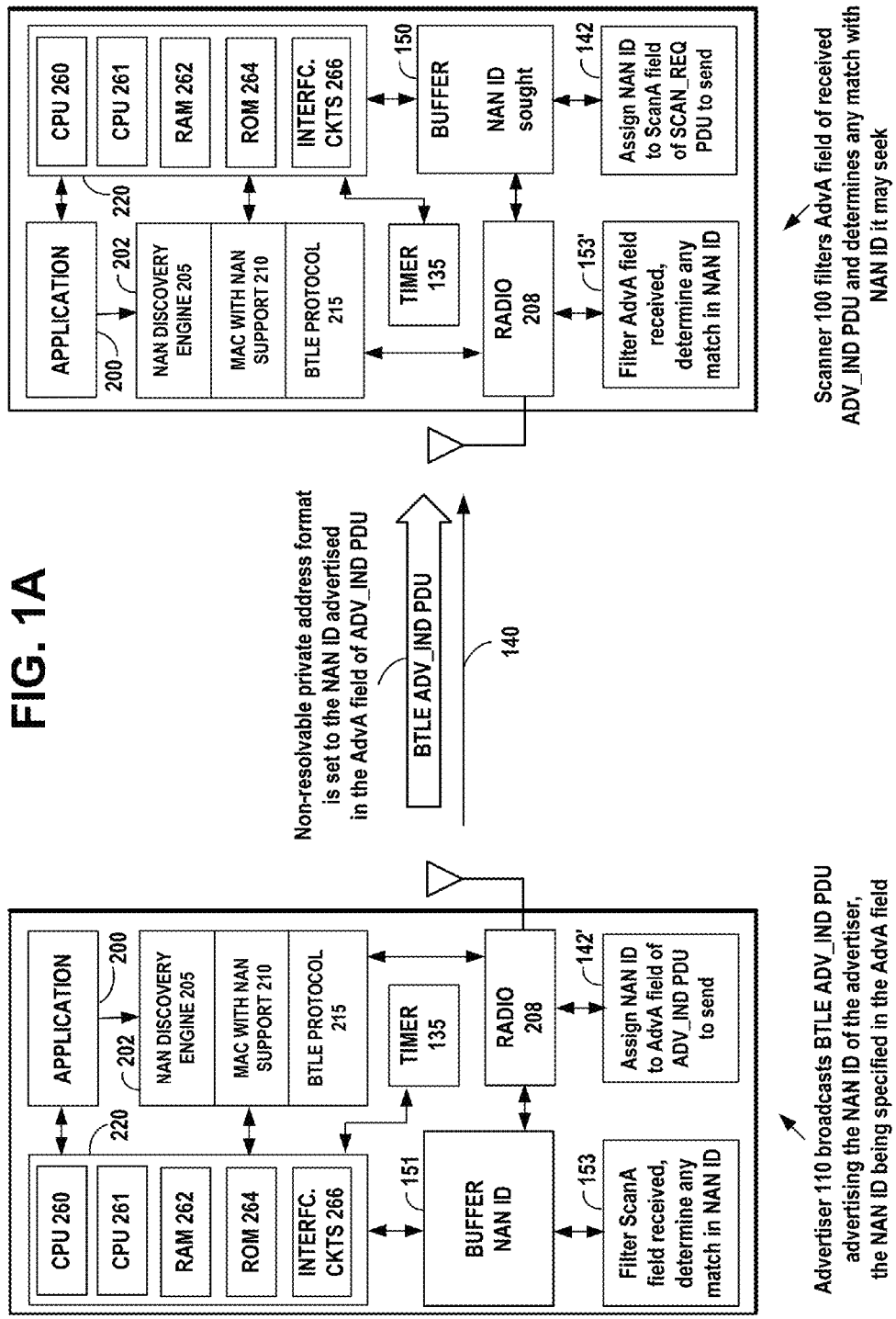

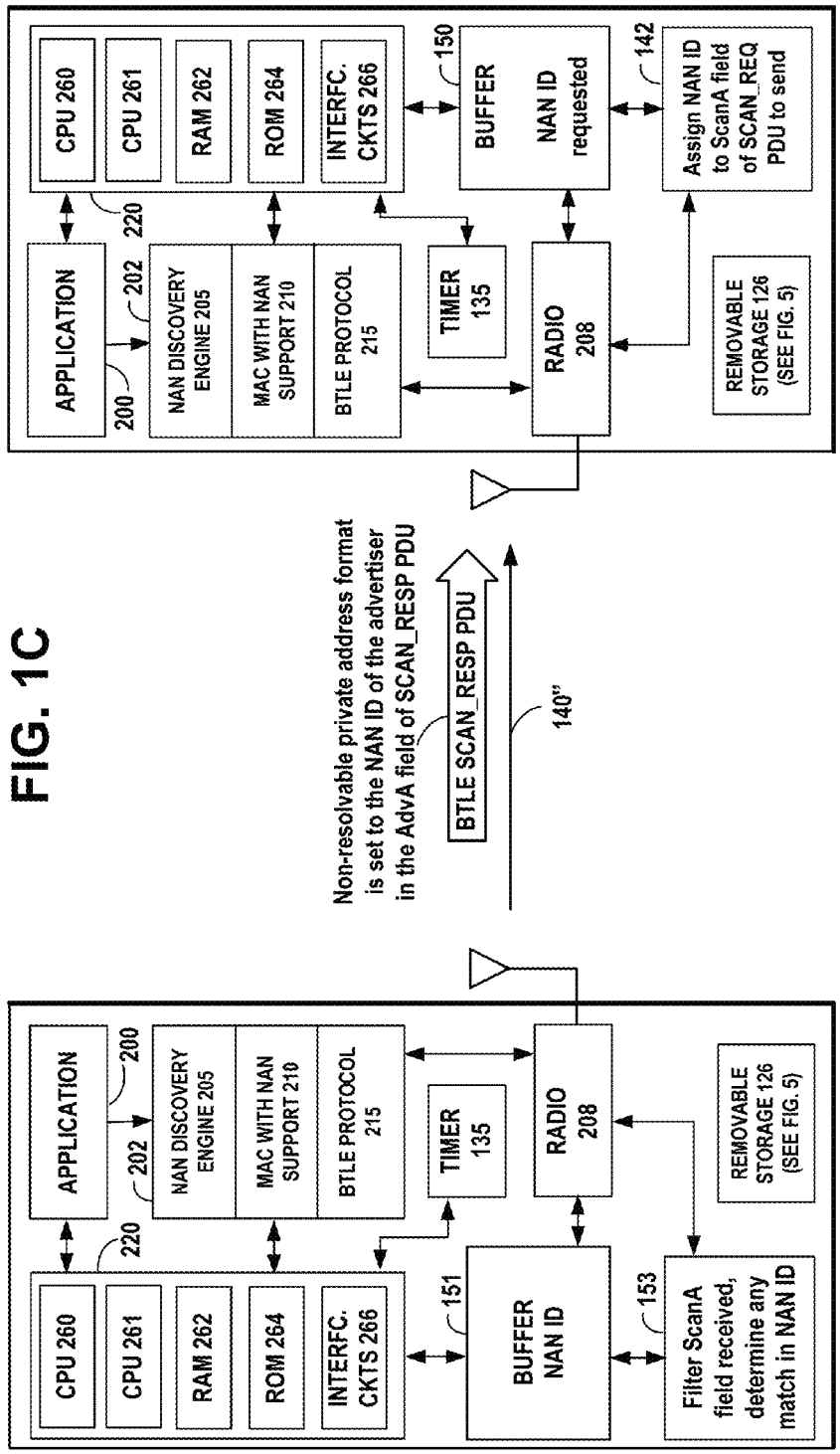

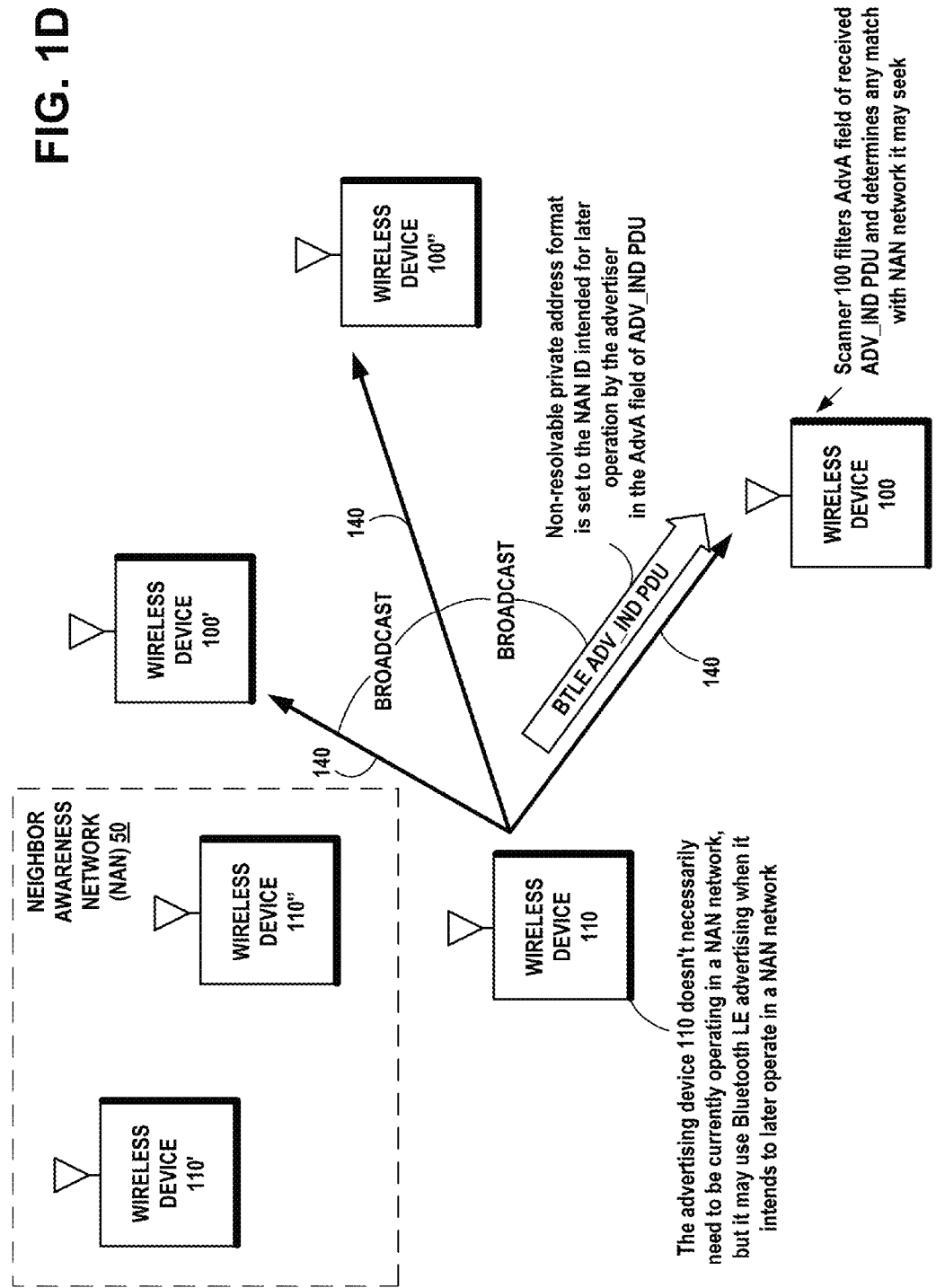

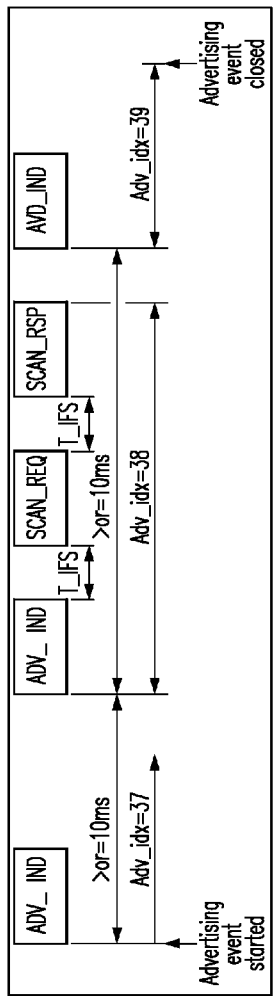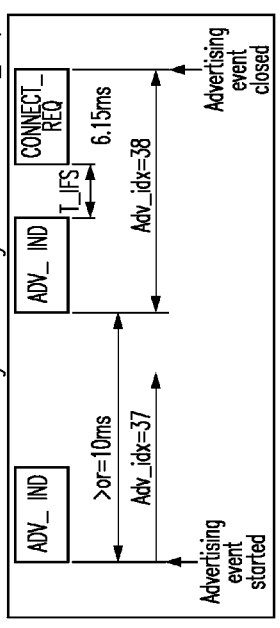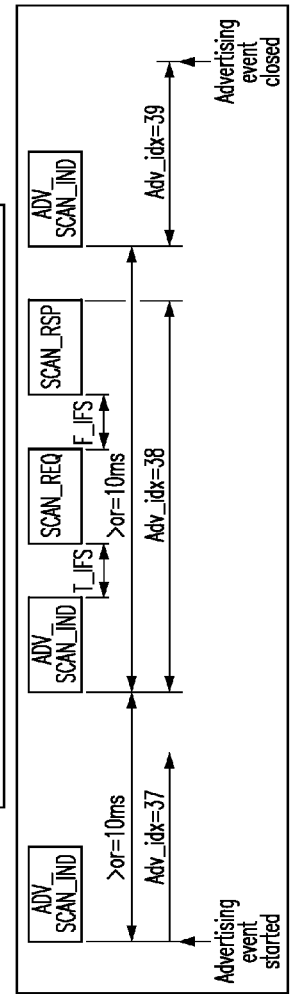
FIG. 2B

Figure 10.5: Format of non-resolvable private address

The 46 bit random part of non-resolvable address is set to according to the NAN identifier.
Either the 46 least or the 46 most significant bits of the NAN identifier are used as the 46 random bits of the non-resolvable private address.

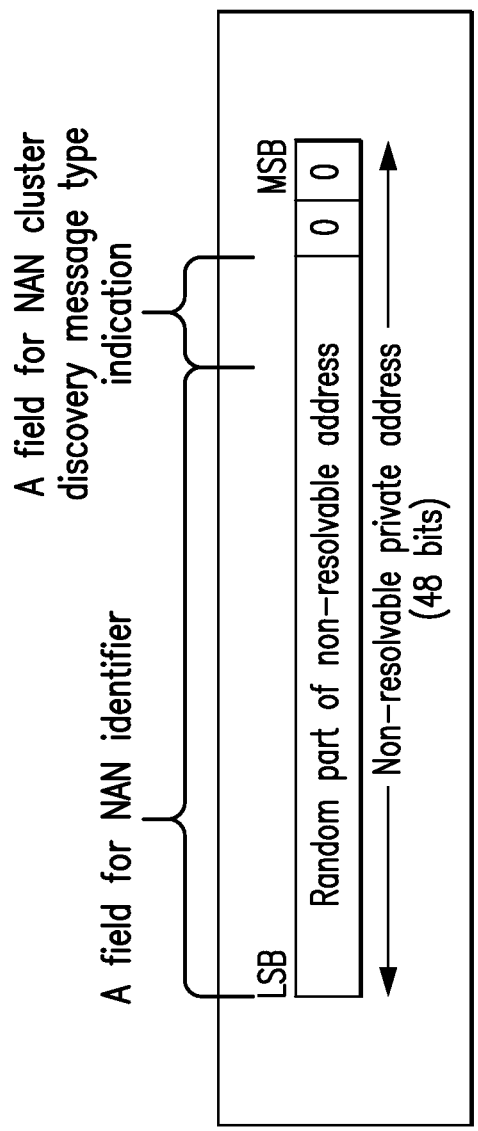

Figure 10.5: Format of non-resolvable private address

FIG. 4B

A portion (e.g. 44 bits) of the random part of non-resolvable address is set to according to the NAN identifier. Either the 44 least or the 44 most significant bits of the NAN identifier are used as the 44 random bits of the non-resolvable private address. Another portion (e.g. 2 bits) of the address are used to indicate whether the message is from a device operating in a NAN network or looking for one.

| Payload | |
|---|---|
| AdvA (6 octets) | AdvData (0-31 octets) |

*Figure 2.7: ADV_SCAN_IND PDU Payload*

| Payload | |
|---|---|
| AdvA (6 octets) | ScanRspData (0-31 octets) |

*Figure 2.9: SCAN_RSP PDU Payload*

AdvData/ScanRspData may contain one or more identifiers of the NAN networks in which the advertiser operates

ADDRESS | DATA

| 2 bits of NAN identifier | Service specific info, list of SIDs and indications of whether the SID relates to publish or/and subscribe |

This approach may be used with the scheme in Fig 4a

ADDRESS | DATA

| 4 bits of NAN identifier | Service specific info, list of SIDs and indications of whether the SID relates to publish or/and subscribe |

This approach may be used with the scheme in Fig 4b

AdvData/ScanRspData may contain one or more identifiers of the NAN networks in which the advertiser operates

STEP 302: INSERTING, BY AN APPARATUS, AN INDICATION ASSOCIATED WITH A NEIGHBOR AWARENESS NETWORK TO BE ADVERTISED TO AN APPARATUS ADDRESS FIELD OF A WIRELESS ADVERTISEMENT PACKET (FOR EXAMPLE AN ADV_IND PDU ADVERTISEMENT PACKET); AND

STEP 304: TRANSMITTING, BY THE APPARATUS, THE WIRELESS ADVERTISEMENT PACKET INCLUDING THE INSERTED INDICATION ASSOCIATED WITH THE NEIGHBOR AWARENESS NETWORK TO BE ADVERTISED.

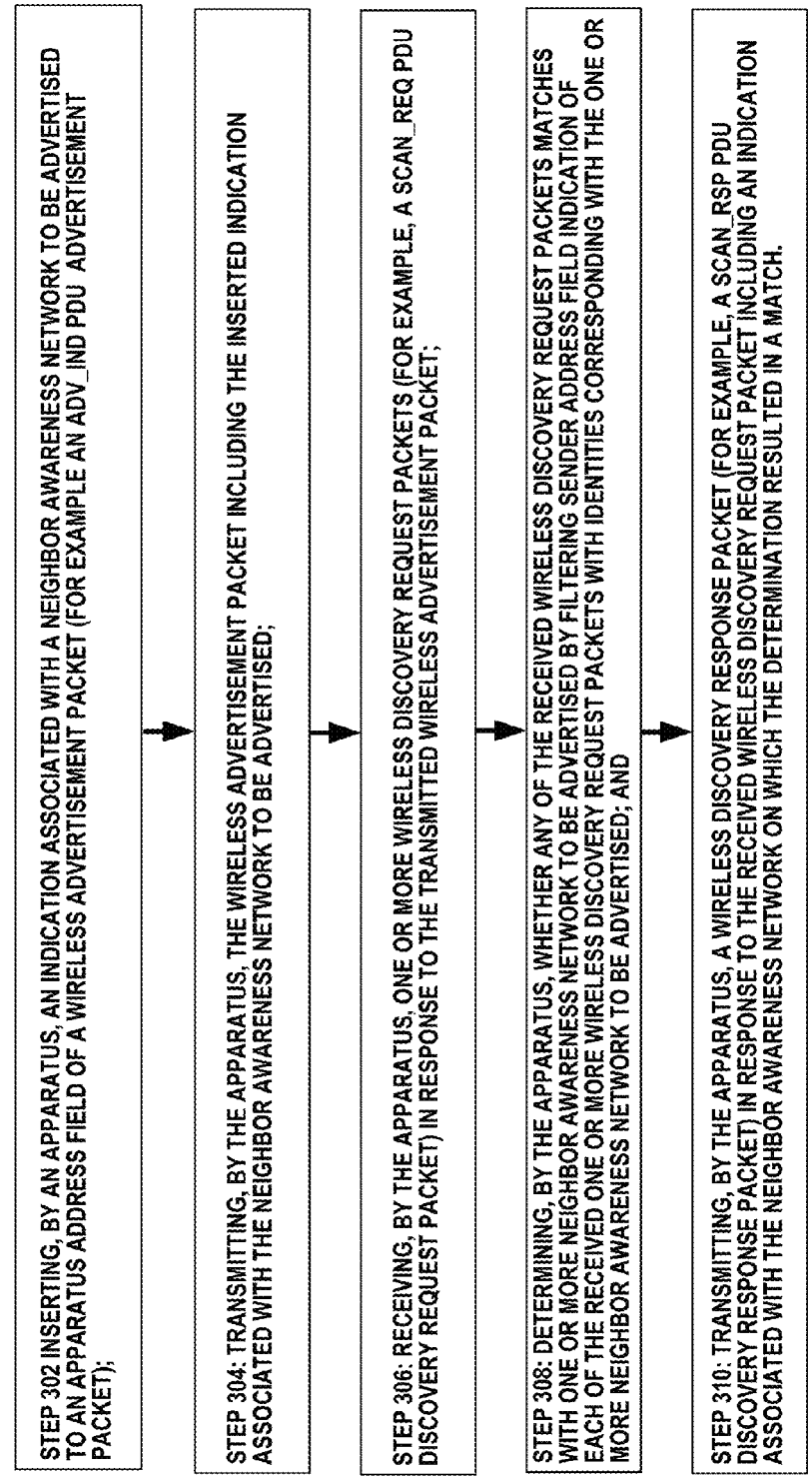

STEP 402 INSERTING, BY AN APPARATUS, AN INDICATION ASSOCIATED WITH A REQUIRED NEIGHBOR AWARENESS NETWORK TO AN APPARATUS ADDRESS FIELD OF A WIRELESS ADVERTISEMENT PACKET (FOR EXAMPLE AN ADV_IND PDU ADVERTISEMENT PACKET); AND

STEP 404: TRANSMITTING, BY THE APPARATUS, THE WIRELESS ADVERTISEMENT PACKET INCLUDING THE INSERTED INDICATION ASSOCIATED WITH THE REQUIRED NEIGHBOR AWARENESS NETWORK.

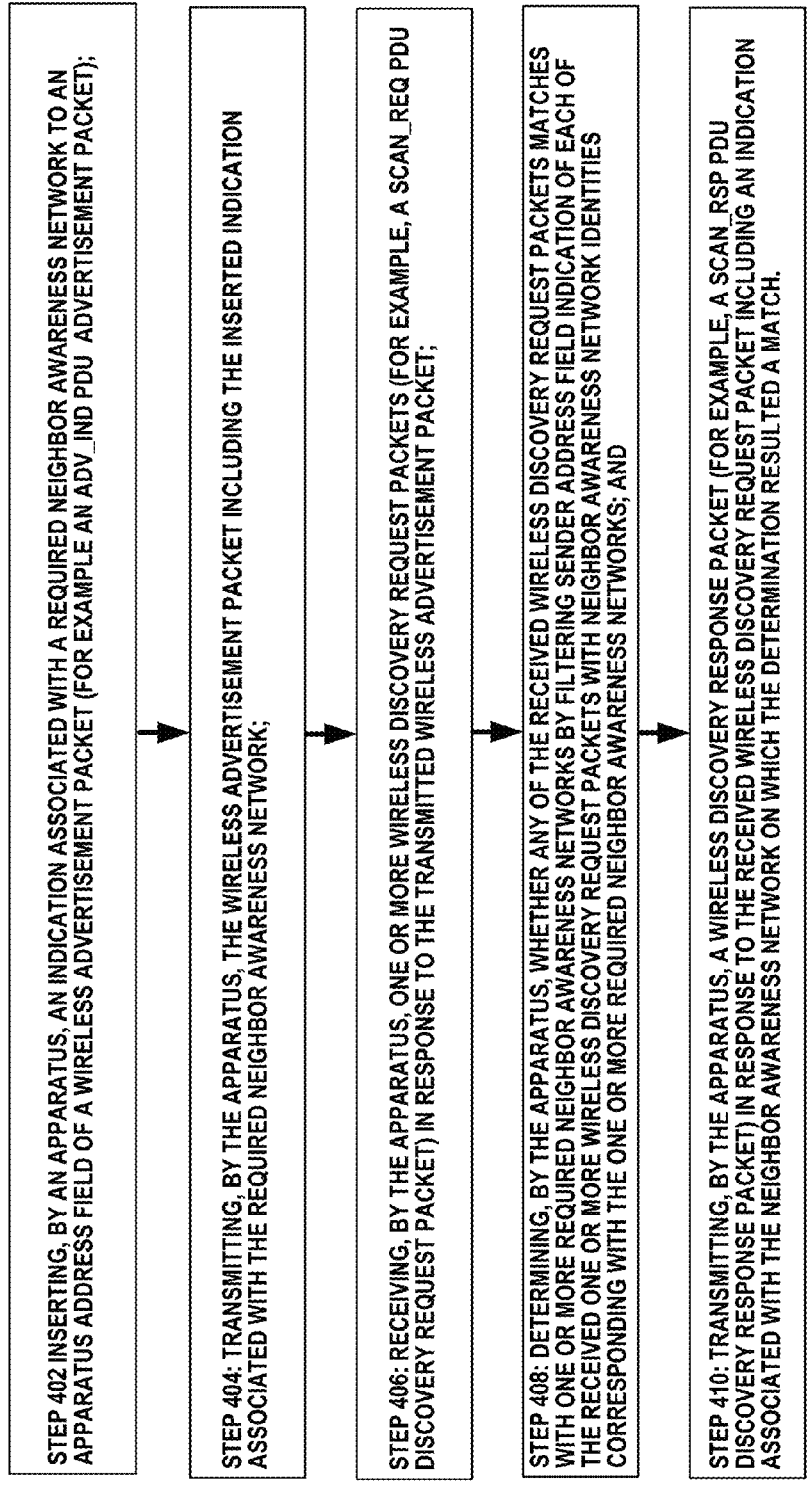

STEP 402: INSERTING, BY AN APPARATUS, AN INDICATION ASSOCIATED WITH A REQUIRED NEIGHBOR AWARENESS NETWORK TO AN APPARATUS ADDRESS FIELD OF A WIRELESS ADVERTISEMENT PACKET (FOR EXAMPLE AN ADV_IND PDU ADVERTISEMENT PACKET);

STEP 404: TRANSMITTING, BY THE APPARATUS, THE WIRELESS ADVERTISEMENT PACKET INCLUDING THE INSERTED INDICATION ASSOCIATED WITH THE REQUIRED NEIGHBOR AWARENESS NETWORK;

STEP 406: RECEIVING, BY THE APPARATUS, ONE OR MORE WIRELESS DISCOVERY REQUEST PACKETS (FOR EXAMPLE, A SCAN_REQ PDU DISCOVERY REQUEST PACKET) IN RESPONSE TO THE TRANSMITTED WIRELESS ADVERTISEMENT PACKET;

STEP 408: DETERMINING, BY THE APPARATUS, WHETHER ANY OF THE RECEIVED WIRELESS DISCOVERY REQUEST PACKETS MATCHES WITH ONE OR MORE REQUIRED NEIGHBOR AWARENESS NETWORKS BY FILTERING SENDER ADDRESS FIELD INDICATION OF EACH OF THE RECEIVED ONE OR MORE WIRELESS DISCOVERY REQUEST PACKETS WITH NEIGHBOR AWARENESS NETWORK IDENTITIES CORRESPONDING WITH THE ONE OR MORE REQUIRED NEIGHBOR AWARENESS NETWORKS; AND

STEP 410: TRANSMITTING, BY THE APPARATUS, A WIRELESS DISCOVERY RESPONSE PACKET (FOR EXAMPLE, A SCAN_RSP PDU DISCOVERY RESPONSE PACKET) IN RESPONSE TO THE RECEIVED WIRELESS DISCOVERY REQUEST PACKET INCLUDING AN INDICATION ASSOCIATED WITH THE NEIGHBOR AWARENESS NETWORK ON WHICH THE DETERMINATION RESULTED A MATCH.

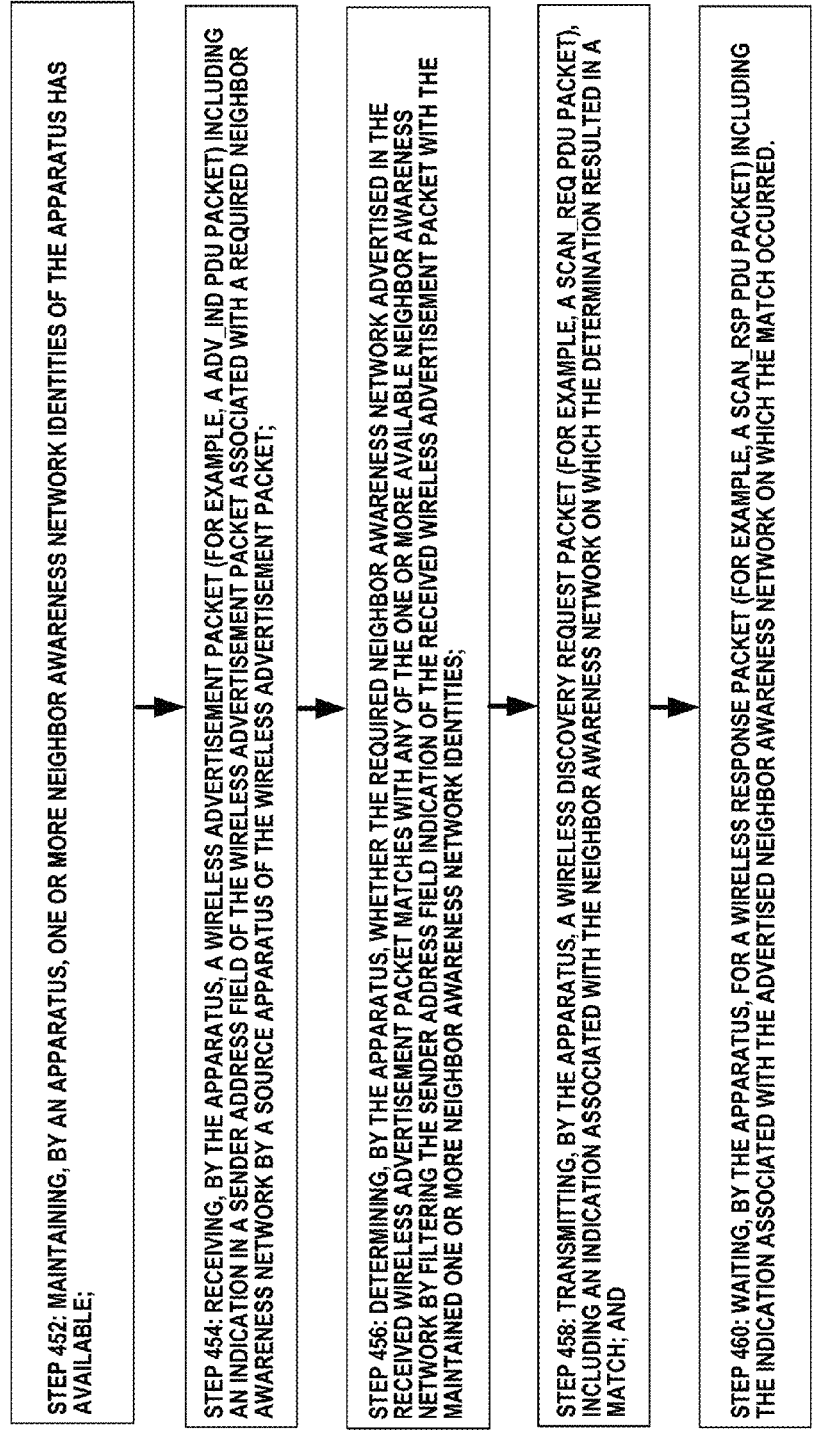

STEP 452: MAINTAINING, BY AN APPARATUS, ONE OR MORE NEIGHBOR AWARENESS NETWORK IDENTITIES OF THE APPARATUS HAS AVAILABLE;

STEP 454: RECEIVING, BY THE APPARATUS, A WIRELESS ADVERTISEMENT PACKET (FOR EXAMPLE, A ADV_IND PDU PACKET) INCLUDING AN INDICATION IN A SENDER ADDRESS FIELD OF THE WIRELESS ADVERTISEMENT PACKET ASSOCIATED WITH A REQUIRED NEIGHBOR AWARENESS NETWORK BY A SOURCE APPARATUS OF THE WIRELESS ADVERTISEMENT PACKET;

STEP 456: DETERMINING, BY THE APPARATUS, WHETHER THE REQUIRED NEIGHBOR AWARENESS NETWORK ADVERTISED IN THE RECEIVED WIRELESS ADVERTISEMENT PACKET MATCHES WITH ANY OF THE ONE OR MORE AVAILABLE NEIGHBOR AWARENESS NETWORK BY FILTERING THE SENDER ADDRESS FIELD INDICATION OF THE RECEIVED WIRELESS ADVERTISEMENT PACKET WITH THE MAINTAINED ONE OR MORE NEIGHBOR AWARENESS NETWORK IDENTITIES;

STEP 458: TRANSMITTING, BY THE APPARATUS, A WIRELESS DISCOVERY REQUEST PACKET (FOR EXAMPLE, A SCAN_REQ PDU PACKET), INCLUDING AN INDICATION ASSOCIATED WITH THE NEIGHBOR AWARENESS NETWORK ON WHICH THE DETERMINATION RESULTED IN A MATCH; AND

STEP 460: WAITING, BY THE APPARATUS, FOR A WIRELESS RESPONSE PACKET (FOR EXAMPLE, A SCAN_RSP PDU PACKET) INCLUDING THE INDICATION ASSOCIATED WITH THE ADVERTISED NEIGHBOR AWARENESS NETWORK ON WHICH THE MATCH OCCURRED.

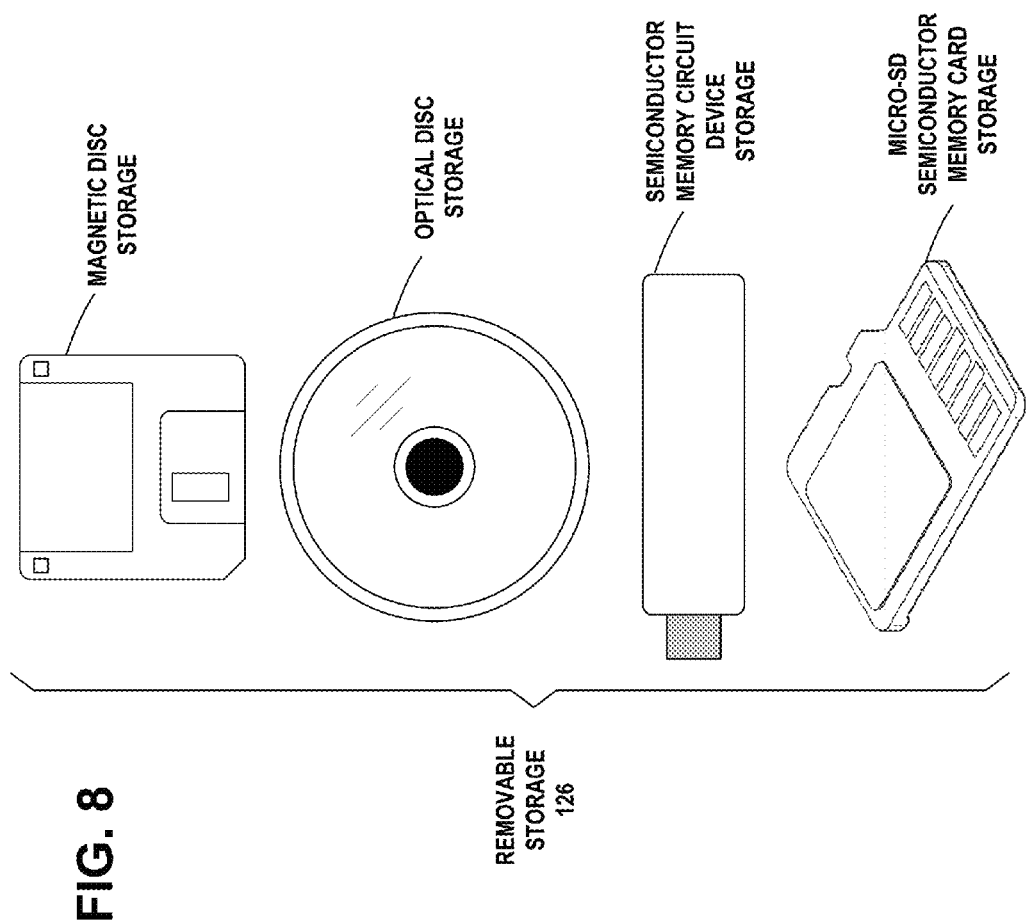

METHOD, APPARATUS, AND COMPUTER PROGRAM PRODUCT FOR NETWORK DISCOVERY

FIELD

The field of the invention relates to wireless short-range communication and more particularly to discovery of networks in a wireless communications medium.

BACKGROUND

Modern society has adopted, and is becoming reliant upon, wireless communication devices for various purposes, such as, connecting users of the wireless communication devices with other users. Wireless communication devices can vary from battery powered handheld devices to household and/or commercial devices utilizing electrical network as a power source. Due to rapid development of the wireless communication devices a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, such as GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy (LE), IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features that make them appropriate for various applications.

Applications for short-range wireless devices are evolving to include awareness applications providing the device with an awareness about the local network environment. Awareness applications have the promise of extending business and social networking by enabling users to share local contextual data in a peer-to-peer fashion by using their mobile wireless devices. For example, users may be able to share information in real-time for local-area business networking, social networking, dating, personal safety, advertising, publishing, and searching.

SUMMARY

Method, apparatus, and computer program product example embodiments enable discovery of networks in a wireless communications medium.

According to an example embodiment of the invention, a method comprises:

inserting, by an apparatus, an indication associated with a neighbor awareness network to be advertised to an apparatus address field of a wireless advertisement packet; and transmitting, by the apparatus, the wireless advertisement packet including the inserted indication associated with the neighbor awareness network to be advertised.

According to an example embodiment of the invention, a method comprises:

wherein the apparatus address field is a non-resolvable private address format in an AdvA field of either the Bluetooth Low Energy ADV_IND PDU packet or the Bluetooth Low Energy ADV_SCAN_IND PDU packet.

According to an example embodiment of the invention, a method comprises:

receiving, by the apparatus, one or more wireless discovery request packets in response to the transmitted wireless advertisement packet;

determining, by the apparatus, whether any of the received wireless discovery request packets matches with the advertised neighbor awareness network by filtering sender address field indication of each of the received one or more wireless discovery request packets with the identity corresponding with the advertised neighbor awareness network; and transmitting, by the apparatus, a wireless discovery response packet in response to the received wireless discovery request packet, including the indication associated with the neighbor awareness network.

According to an example embodiment of the invention, a method comprises:

maintaining, by an apparatus, an indication of neighbor awareness network in which the apparatus wishes to operate;

receiving, by the apparatus, a wireless advertisement packet including an indication in a sender address field of the advertisement packet associated with a neighbor awareness network available in a source apparatus of the wireless advertisement packet;

determining, by the apparatus, whether the neighbor awareness network indicated available in the received wireless advertisement packet matches with a neighbor awareness network in which the apparatus wishes to operate by filtering the sender address field indication of the received wireless advertisement packet with the maintained neighbor awareness network indication; and transmitting, by the apparatus, a wireless discovery request packet, including an indication associated with the neighbor awareness network in which the apparatus wishes to operate when the determination resulted in a match.

According to an example embodiment of the invention, a method comprises:

wherein the wireless advertisement packet is a Bluetooth Low Energy ADV_IND PDU packet or a Bluetooth Low Energy ADV_SCAN_IND PDU packet and the sender address field of the wireless advertisement packet is a non-resolvable private address format in an AdvA field of either the Bluetooth Low Energy ADV_IND PDU packet or the Bluetooth Low Energy ADV_SCAN_IND PDU packet.

According to an example embodiment of the invention, a method comprises:

wherein the wireless discovery request packet is a SCAN_REQ PDU packet and the indication associated with the neighbor awareness network on which the determination resulted a match is a non-resolvable private address format in a ScanA field of the SCAN_REQ PDU packet.

According to an example embodiment of the invention, a method comprises:

waiting, by the apparatus, for a wireless discovery response packet including the indication associated with the available neighbor awareness network on which the match occurred.

According to an example embodiment of the invention, an apparatus comprises:

at least one processor;

at least one memory including computer program code;

the at least one memory and the computer program code configured to, with the at least one processor, cause the apparatus at least to:

insert an indication associated with a neighbor awareness network to be advertised to an apparatus address field of a wireless advertisement packet; and transmit the wireless advertisement packet including the inserted indication associated with the neighbor awareness network to be advertised.

According to an example embodiment of the invention, an apparatus comprises:

wherein the apparatus address field is a non-resolvable private address format in an AdvA field of either the Bluetooth Low Energy ADV_IND PDU packet or the Bluetooth Low Energy ADV_SCAN_IND PDU packet.

According to an example embodiment of the invention, an apparatus comprises:

the at least one memory and the computer program code configured to, with the at least one processor, cause the apparatus at least to:

receive one or more wireless discovery request packets in response to the transmitted wireless advertisement packet;

determine whether any of the received wireless discovery request packets matches with the advertised neighbor awareness network by filtering sender address field indication of each of the received one or more wireless discovery request packets with the identity corresponding with the advertised neighbor awareness network; and transmit a wireless discovery response packet in response to the received wireless discovery request packet, including the indication associated with the neighbor awareness network.

According to an example embodiment of the invention, an apparatus comprises:

at least one processor;

at least one memory including computer program code;

the at least one memory and the computer program code configured to, with the at least one processor, cause the apparatus at least to:

maintain an indication of a neighbor awareness network in which the apparatus wishes to operate;

receive a wireless advertisement packet including an indication in a sender address field of the advertisement packet associated with a neighbor awareness network available in a source apparatus of the advertisement packet;

determine whether the neighbor awareness network indicated available in the received wireless advertisement packet matches with the neighbor awareness network in which the apparatus wishes to operate by filtering the sender address field indication of the received wireless advertisement packet with the maintained neighbor awareness network indication; and transmit a wireless discovery request packet, including an indication associated with the neighbor awareness network in which the apparatus wishes to operate when the determination resulted in a match.

According to an example embodiment of the invention, an apparatus comprises:

wherein the wireless advertisement packet is a Bluetooth Low Energy ADV_IND PDU packet or a Bluetooth Low Energy ADV_SCAN_IND PDU packet and the sender address field of the wireless advertisement packet is a non-resolvable private address format in an AdvA field of either the Bluetooth Low Energy ADV_IND PDU packet or the Bluetooth Low Energy ADV_SCAN_IND PDU packet.

According to an example embodiment of the invention, an apparatus comprises:

wherein the wireless discovery request packet is a SCAN_REQ PDU packet and the indication associated with the neighbor awareness network on which the determination resulted a match is a non-resolvable private address format in a ScanA field of the SCAN_REQ PDU packet.

According to an example embodiment of the invention, an apparatus comprises:

the at least one memory and the computer program code configured to, with the at least one processor, cause the apparatus at least to:

wait for a wireless discovery response packet including the indication associated with the available neighbor awareness network on which the match occurred.

According to an example embodiment of the invention, a computer program product comprising computer executable program code recorded on a computer readable non-transitory storage medium, the computer executable program code comprising:

code for inserting, by an apparatus, an indication associated with a neighbor awareness network to be advertised to an apparatus address field of a wireless advertisement packet; and code for transmitting, by the apparatus, the wireless advertisement packet including the inserted indication associated with the neighbor awareness network to be advertised.

According to an example embodiment of the invention, a computer program product comprising computer executable program code recorded on a computer readable non-transitory storage medium, the computer executable program code comprising:

code for receiving, by the apparatus, one or more wireless discovery request packets in response to the transmitted wireless advertisement packet;

code for determining, by the apparatus, whether any of the received wireless discovery request packets matches with the advertised neighbor awareness network by filtering sender address field indication of each of the received one or more wireless discovery request packets with the identity corresponding with the advertised neighbor awareness network; and code for transmitting, by the apparatus, a wireless discovery response packet in response to the received wireless discovery request packet, including the indication associated with the neighbor awareness network.

According to an example embodiment of the invention, a computer program product comprising computer executable program code recorded on a computer readable non-transitory storage medium, the computer executable program code comprising:

code for maintaining, by an apparatus, an indication of a neighbor awareness network in which the apparatus wishes to operate;

code for receiving, by the apparatus, a wireless advertisement packet including an indication in a sender address field of the advertisement packet associated with a neighbor awareness network available in a source apparatus of the wireless advertisement packet;

code for determining, by the apparatus, whether the neighbor awareness network indicated available in the received wireless advertisement packet matches with a neighbor awareness network in which the apparatus wishes to operate by filtering the sender address field indication of the received wireless advertisement packet with the maintained neighbor awareness network indication; and code for transmitting, by the apparatus, a wireless discovery request packet, including an indication associated with the neighbor awareness network in which the apparatus wishes to operate when the determination resulted in a match.

According to an example embodiment of the invention, a computer program product comprising computer executable program code recorded on a computer readable non-transitory storage medium, the computer executable program code comprising:

code for waiting, by the apparatus, for a wireless discovery response packet including the indication associated with the available neighbor awareness network on which the match occurred.

DESCRIPTION OF THE FIGURES

FIG. 1 illustrates an example network diagram of a Bluetooth Low Energy (LE) wireless device 110 functioning as an advertiser and being a member of a neighbor awareness network (NAN) 50 and thus operating in a NAN network, in accordance with at least one embodiment of the present invention.

FIG. 1A is an example functional block diagram of the Bluetooth Low Energy (LE) wireless device 110 functioning as an advertiser, assigning a specified NAN ID to the AdvA field of the ADV_IND PDU and broadcasting the ADV_IND PDU to the Bluetooth LE wireless device 100 that is shown functioning as a NAN scanner, in accordance with at least one embodiment of the present invention.

FIG. 1C is an example functional block diagram of the Bluetooth Low Energy (LE) wireless device 110 functioning as an advertiser and the Bluetooth LE wireless device 100 functioning as a NAN scanner. If the filtering of the ScanA field of received SCAN_REQ PDU 140' in FIG. 1B determines that there is a match, then the advertiser 110 sends a Bluetooth LE SCAN_RSP PDU 140" including the NAN ID on which the match occurred, in the AdvA field of the SCAN_RSP PDU 140", providing information about the NAN network associated with the NAN ID. The Bluetooth LE wireless device 110 assigns the specified NAN ID to the AdvA field of the SCAN_RSP PDU 140", in accordance with at least one embodiment of the present invention.

FIG. 1D illustrates an example network diagram of a Bluetooth Low Energy (LE) wireless device 110 functioning as an advertiser. Bluetooth Low Energy (LE) wireless device 110 is not currently operating in the NAN network 50, but it uses Bluetooth LE advertising when it intends to later operate in the NAN network 50, in accordance with at least one embodiment of the present invention.

FIG. 2B illustrates the example formats of Bluetooth LE connectable undirected and scannable undirected advertising events. Connectable undirected events allow for active scanning and connection requests. Scannable undirected events allow for active scanning, but disallow connection requests.

FIG. 4B illustrates an example of the Address field content option. A 44 bit random part of non-resolvable address is set to according to the NAN ID one is either looking for (seek) or indicating available (advertise). Either the 44 least or the 44 most significant bits of the NAN ID are used as the 44 random bits of the non-resolvable private address. 2 bits of the address is used to indicate whether the message is from a device operating in a NAN network (advertise) or from a device looking for a NAN network (seek).

FIG. 5 illustrates an example of the AdvData/ScanRspData content. The top format may be used with the scheme in FIG. 4A. The bottom format may be used with the scheme in FIG. 4B.

FIG. 6A is an example flow diagram 300 of operational steps of the Bluetooth LE advertising device 110 indicating availability of a NAN network and a NAN cluster, sending a Bluetooth LE ADV_IND or ADV_SCAN_IND PDU seeking to advertise that a NAN ID specified in the AdvA field of the ADV_IND/ADV_SCAN_IND PDU, is available from the advertiser 110, for either present or future operation, in accordance with at least one embodiment of the present invention. The advertising device 110 doesn't necessarily need to be currently operating in a NAN network, but it may use Bluetooth LE advertising when it intends to later operate in a NAN network.

FIG. 6B is an example flow diagram 305 of operational steps of the Bluetooth LE advertising device 110 of FIG. 6A indicating availability of a NAN network and a NAN cluster, receives a response to the advertising packet, by receiving a wireless, discovery request packet, such as a Bluetooth LE SCAN_REQ PDU, requesting the NAN network identified by the NAN ID. In response, the Bluetooth LE wireless device 110 functioning as an advertiser, may filter the received NAN ID indication in the SCAN_REQ PDU to determine whether there is any match of the received NAN ID indication with one or more identities of NAN networks available from the advertising device 110, in accordance with at least one embodiment of the present invention.

FIG. 7A is an example flow diagram 400 of operational steps of the Bluetooth LE advertising device 110 looking for a NAN network, sending a Bluetooth LE ADV_IND or ADV_SCAN_IND PDU seeking to discover a NAN ID available from another device, having a NAN ID specified in the AdvA field of the ADV_IND/ADV_SCAN_IND PDU, in accordance with at least one embodiment of the present invention.

FIG. 7B is an example flow diagram 405 of operational steps of the Bluetooth LE advertising device 110 looking for a NAN network of FIG. 7A, receiving a wireless, discovery request packet, such as a Bluetooth LE SCAN_REQ PDU, indicating an available NAN network identified by the NAN ID. The received wireless request packet includes the NAN ID indication associated with the NAN ID available in the sender in the sender's address field, such as the ScanA field. In response to receiving the wireless discovery request packet, the Bluetooth LE wireless device 110 functioning as an advertiser, may filter the received NAN ID indication in the SCAN_REQ PDU to determine whether there is any match of the received NAN ID indication with one or more NAN identities of required NAN IDs, in accordance with at least one embodiment of the present invention.

FIG. 7C is an example flow diagram 450 of operational steps of the Bluetooth LE scanning device 100 looking for a NAN network of FIG. 7B. The device 100 filters and analyzes the AdvA field of the received ADV_IND or ADV_SCAN_IND PDU and determines whether there is any match with the buffered NAN IDs, for NAN discovery. If the filtering determines that there is a match, the Bluetooth LE wireless device 100 prepares a wireless discovery response packet, SCAN_REQ PDU, to be transmitted including the indication associated with the NAN ID on which the match occurred, in accordance with at least one embodiment of the present invention.

FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

DISCUSSION OF EXAMPLE EMBODIMENTS OF THE INVENTION

Figure 1B:
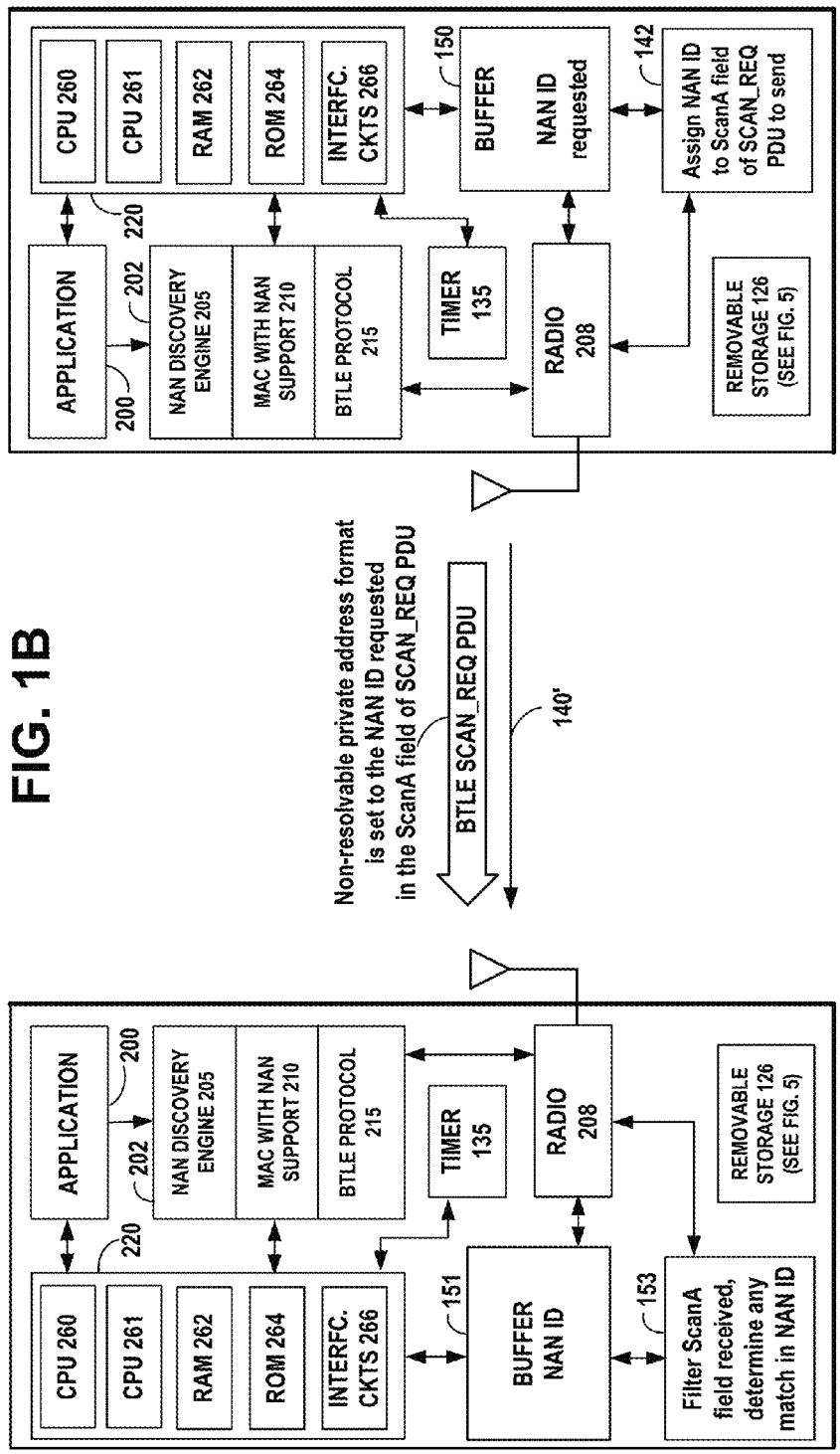
FIG. 1B is an example functional block diagram of the Bluetooth LE wireless device 100 functioning as a NAN scanner, filtering the AdvA field of received ADV_IND PDU 140 in FIG. 1A, determining that there is a match, and then sending a Bluetooth LE SCAN_REQ PDU 140' including the NAN ID on which the match occurred, in the ScanA field of the SCAN_REQ PDU 140', indicating the scanner 100 is seeking the NAN ID, in accordance with at least one embodiment of the present invention.

This section is organized into the following topics:
A. Bluetooth™ Low Energy (LE) Technology
B. Awareness Network Technology
C. Neighbor Awareness Networking (NAN)
D. NAN Discovery With Bluetooth Low Energy
A. Bluetooth™ Low Energy (LE) Technology The Bluetooth™ Core Specification, Version 4.0 includes the Bluetooth Low Energy (LE) protocol for products that require lower power consumption, lower complexity, and lower cost than would be possible using the Bluetooth basic rate/enhanced data rate (BR/EDR) protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The link layer (LL) provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, up to a maximum of 27 octets of payload, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, that receives the advertising packet, may make a scan request (SCAN_REQ) to the advertiser device on the same advertising PHY channel. The SCAN_REQ request includes fields for scanner's address and advertiser's address. A SCAN_REQ is a request to an advertiser for further information about the advertiser and its services. Upon receiving a SCAN_REQ request the advertiser replies with a SCAN_RSP response that it transmits to the scanner on the same advertising PHY channel.

Alternatively, or additionally, the scanner device that receives the advertising packet, may enter into connection initiation phase and take the role of an initiator device, by making a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.0, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth Specification V4.0, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator successfully discovers the advertising device. For the initiator, it can directly send back a "CONN_REQ" to establish a connection with that advertiser. For a scanner, it can send out a "SCAN_REQ" to ask for more information from that advertiser.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

Bluetooth LE supports a feature that reduces the ability to track a LE device over a period of time by changing the Bluetooth device address on a frequent basis. The privacy feature is not used in the GAP discovery mode and procedures but it is used when supported during connection mode and connection procedures. In order for devices using the privacy feature to reconnect to known devices, the device addresses used when the privacy feature is enabled, private address, must be resolvable to the other devices' identity. The private address is generated using the device's identity key exchanged during the bonding procedure. The private address may be of either of the following two sub-types: Non-resolvable private address and Resolvable private address. The Host can resolve a resolvable private address for peer devices and can associate this address with the peer device. A non-resolvable private address is used as a reconnection address. A privacy enabled device performing the observation procedure uses a non-resolvable private address as the device address when performing active scanning. The observation procedure provides a method for a device to receive connectionless data from a device that is sending advertising events. A device performing the observation procedure may use passive scanning or active scanning to receive advertising events. A device performing the observation procedure may use active scanning to also receive scan response data sent by any device in the broadcast mode that advertises using scannable undirected advertising events. When a device performing the observation procedure receives a resolvable private address in the advertising event, the device may resolve the private address by using a resolvable private address resolution procedure.

B. Awareness Network Technology

Applications for short-range wireless devices are evolving to include awareness applications providing the device with an awareness about the local network environment. A non-limiting example awareness network architecture is the Nokia AwareNet framework, a network of wireless mobile devices self-organizing to support various applications, ranging from social networking to service discovery. Awareness information may be shared by a short-range wireless device sending an anonymous flooding message that may include a query, over an ad hoc network. A neighboring short-range wireless device may reply to the flooding message over the ad hoc network with a response, such as a pointer to a discovered location-based service.

Awareness information may include any information and/or context about a local network environment as well as the users and communication devices within the local network environment. Wireless devices may continuously collect and exchange information with other devices in a local network environment. Awareness applications running on short-range wireless devices may create a network for sharing awareness information, locate and organize awareness information, form communities for sharing awareness information, manage power consumption for devices engaged in sharing awareness information, develop applications to take advantage of the awareness information, and maintain the privacy and anonymity of users sharing awareness information.

Awareness applications running on short-range wireless devices, build upon a scheme in which every device is responsible for participating in beaconing and all the other basic operations that keep the ad hoc network in operation. An ad hoc network may be designed to have one network identifier (NWID) that all of the devices in the network share. The NWID may be announced in the beacons transmitted by the devices. In the overall design, those devices that operate under same NWID are driven to use a common and shared schedule to allow for awareness information gathering among all the devices within range. The determination of which schedule is used by a device may be made by the network instance timer value, and this timer value is communicated in beacons in the timing synchronization function (TSF) value parameter. The devices may be required to operate by assuming the oldest TSF value (i.e. largest TSF value) contained in the received beacons that represent the network with the NWID in which the devices are operating. Alternatively the devices may be required to select the schedule which to follow based on some other criteria than the TSF value. Beacons may, as an example, contain some other information than the TSF that is used by the devices to determine which schedule to use.

When the radio and MAC of a wireless device transmits a Beacon, the Beacon MAC-header contains device's own current TSF value. The device may automatically transmit a reply message when it receives a Beacon from another network, the reply message being referred herein as a beacon response message. The beacon response message contains the current TSF value of the replying network. Alternatively the beacon response message may contain other information that is used to determine which schedule to use.

Wireless devices form a network where all devices in proximity may communicate with each other. When two or more groups of devices forming two or more instances of the network come close to each other, the two or more instances may merge to become one network instance. Devices may make a merging or join decision to change the instance autonomously based on the TSF information collected from Beacons received during scan periods or based on the TSF information collected from received beacon response messages. A merging decision may be performed when a device receives a Beacon or beacon response message with an older (greater) TSF value from another wireless device. Alternatively a merging decision may be done based on some other information available in a Beacon or beacon response message from another wireless device. After the merging decision has been performed by a device, the device moves into the new network instance.

The awareness functionality in a short-range wireless device may be divided between four layers in the awareness architecture. The Awareness Layer and the Community Layer provide services for applications, i.e. provide the awareness API. The approximate functional split between the different layers is as follows.

Awareness Layer

According to an embodiment, Awareness Layer (AwL) has the highest level of control of the awareness architecture. Example services the AwL offers to the applications comprise Publish and Subscribe. The Awareness Layer receives publish and subscribe requests from applications and maps these into queries and query responses that, in turn, are mapped as awareness messages, the Network Layer PDU, that traverse from device to device. It also maps the awareness messages received by the device, to the application. The network layer does not appear as a data pipe for applications. A single awareness message is self-contained and short, the AwL compresses the messages in order for them to consume as little resources as possible.

The Awareness Layer may comprise an internal storage of awareness data items. Publishing an item normally means storing it in this internal storage (passive publish). Such an item is visible to other devices in the local vicinity and may be found using the Subscribe service. It is also possible to use active publishing that causes the Awareness Layer to issue a publish message that propagates from device to device. It is the responsibility of the AwL to decide whether a received message leads to the notification of an application (filtering). Items may be marked to be visible to only certain communities, so that they are visible only to searches made by members of such a community.

The Subscribe request causes the Awareness Layer to issue either a single or repetitive query message(s) that eventually propagate to other devices in the local vicinity (by using the functionality of lower awareness layers). When such a query message reaches the AwL of a device that happens to possess a matching information item, it responds with a reply message. The lower layers of awareness architecture take care of the routing of such a message back to the AwL of the querying device, which notifies the application of the other device that issued the Subscribe request.

Community Layer

The concept of communities has been integrally built into awareness architecture. Awareness communication may be visible to all the devices, or just to those that belong to a certain community. Regardless of this visibility, all wireless devices take part in the routing of messages. The role of the Community Layer (CoL) is to implement the community visibility rules. Only those messages that a certain device has visibility to (i.e. a device belongs to the same community as the message) are passed to the AwL. As an additional level of community privacy, messages are encrypted by the Community Layer. To allow such message filtering and encryption/decryption, the CoL stores the community credentials for those communities to which the user of the device belongs. The default awareness community (all local users) does not use any credentials and therefore its messages simply pass through the Community Layer.

According to an example embodiment, Awareness architecture comprises three different kinds of communities: the default awareness community, peer communities and personal communities. Communities may also be categorized with their privacy. Messages of public communities are transmitted as plain text whereas messages of private communities are transmitted encrypted. The default awareness community is the default community for all wireless devices. Awareness community messages are not encrypted and every node may send and receive awareness community messages (public community). In a peer community all members are equal and every member may receive all the community specific messages. A peer community may be public, or it may be private meaning that community messages are encrypted using a temporary key derived from the community specific shared key. The encryption function may be based on Advanced Encryption Standard, EAX mode (AES/EAX) with 128 bit keys. A personal community has a community owner that manages the community. A non-owner community member may communicate with the owner but not with other members of the community. A personal community is private, meaning that community messages from the owner to other members may be encrypted.

Network Layer

The Network Layer (NL) takes care of the local dissemination of the awareness messages. This is accomplished by way of a smart-flooding algorithm that attempts to adapt to the surrounding device density. At high densities, very few devices participate in the transmission of a given message. At low densities, all the devices may retransmit each message (normal flooding). The awareness network has a flat hierarchy; none of the devices may assume any special roles. Thus, at high densities, all the devices will transmit approximately the same amount of traffic (no clustering). The Network layer may also take care of the routing of the replies back to the device that issued the search. To this end, it collects routing information from the messages that flow through it. It also keeps track of all the neighbors and their approximate distance. Normally, reply routing uses unicast transmissions, whereas flooding messages are always broadcasted. All the messages received by the Network Layer are passed to Community Layer in order to check whether the message should be processed in the AwL.

Link Layer

Link Layer performs the adaptation between the underlying radio technology (e.g. IEEE 802.11 WLAN physical layer) and the Network Layer. It maps the specific information of the radio technology, such as radio identifiers and received signal strengths, into technology neutral information used by the Network Layer (NL). Multiple Link Layer instances may be used by the NL, e.g. for simultaneous usage of different radio technologies.

The Link Layer may be divided into two sub layers: logical link control (LLC) and media access control (MAC). LLC provides radio technology agnostic service for the Network Layer. It hides differences between radio technology specific MACs. LLC provides a single service access point for the Network layer. LLC knows how to map the generic provided service to the service provided by the technology specific MACs. The LLC internal data structures include the Neighbor Table that contains information of all the neighboring devices that have been heard in the recent past.

The Link Layer tries to transmit data via the given medium using the TransmitData functionality. Transmission may succeed or it may fail. Internally the Link Layer may try transmissions several times if a medium is temporarily busy. The Link Layer passes all the messages it receives to the Network Layer. This also includes unicast messages that are intended for other nodes.

The logical link control (LLC) is aware of radio technology specific MACs. In case of the IEEE 802.11 WLAN MAC example, the LLC does the following WLAN MAC specific actions:

Control (Reset, Configure) WLAN MAC.
Decide when to merge WLAN networks.
Construct a message package to be sent to WLAN MAC from outgoing messages.
Select which messages are to be sent and which are ignored immediately, e.g. if there are too many messages to be sent.

Extract incoming data messages contained in reception reports.

Update the Neighbor Table when reception reports and scan reports are received.

Merging of WLAN networks may be the responsibility of the logical link control (LLC). The LLC may determine when to merge two WLAN network instances or beacon groups as a single larger network instance or a beacon group. LLC may calculate an estimate of its own WLAN network size. Estimation may be based on information provided by the Network Layer, information found in the LLC Neighbor Table and network size category shared by other nodes. A network size category is calculated from an estimated network size.

The IEEE 802.11 WLAN MAC awareness mode enables a wireless device to use its power efficiently. In the awareness mode, the WLAN radio is asleep most of the time, thus reducing power consumption. Messages are transmitted and received in a batch mode, i.e. LLC passes all the messages that the MAC is to transmit during a single awake period, in a single package. The MAC passes all the messages received during a single awake period in a single reception report. The LLC collects messages to be transmitted in a single package. When the MAC is awake, the LLC passes the package to the MAC and it tries to transmit the messages. When the MAC is about to go asleep, it sends a transmission report to the LLC containing information about messages it has succeeded to transmit and about messages it has failed to transmit. In addition MAC passes a reception report to LLC. The report contains messages received during the awake period.

According to an embodiment, the merging or joining process is a purely local process that occurs entirely internally to the wireless device. There is no indication to the outside world that a device has joined a particular ad hoc network. Joining an ad hoc network may require that all of the mobile device's MAC and physical parameters be synchronized with the desired ad hoc network. To do this, the device may update its timer with the TSF value of the timer from the ad hoc network description, modified by adding the time elapsed since the description was acquired. This will synchronize the device's timer to the ad hoc network. The BSSID of the ad hoc network may be adopted, as well as the parameters in the capability information field. Once this process is complete, the wireless device has joined the ad hoc network and is ready to begin communicating with the wireless devices in the ad hoc network.

The IEEE 802.11 WLAN MAC awareness mode provides the following functionalities:

Reset MAC.
Configure MAC.
Join a WLAN network or create a new network.
Join an existing WLAN network (BSSID is known).
Set a template for beacon frames so that LLC parameters can be passed in WLAN beacon frames.
Try to transmit a set of messages.
Receive a set of incoming messages.
Receive a set of WLAN scan messages
Message Propagation According to an embodiment, the propagation of an awareness search message is conducted in the awareness architecture layers of different devices. An application initiates a subscription in the device by using the Subscribe service offered by the Awareness Layer. The Awareness Layer realizes the subscription by sending a query message to other devices. In all the devices the message goes at least up to the Community Layer. However, only in those devices that belong to the community to which the message was intended, does the message proceed to the AwL. There is no need to have an application present in the replying device. It is sufficient to only have the awareness platform active.

C. Neighbor Awareness Networking (NAN)

In accordance with an example embodiment, the invention may be used in the logical architecture of the Neighbor Awareness Networking (NAN) program being standardized by the Wi-Fi Alliance (WFA). The NAN protocol stack is expected to comprise of two components: 1) NAN Discovery Engine, 2) MAC with NAN support. MAC with NAN support is a variant of Wi-Fi MAC and provides means for NAN devices to synchronize in time and frequency to provide common availability periods for service discovery frames from/to the NAN Discovery Engine.

NAN Discovery Engine

The NAN Discovery Engine provides Publish and Subscribe services to the applications for service discovery purposes.

Publishing is the ability to make application-selected information about e.g. capabilities and services available for other NAN devices that seek information with Subscribing, using protocols and mechanisms certified by the Neighbor Awareness Networking program. NAN devices that use Publishing may provide published information in an unsolicited or solicited manner.

Subscribing is the ability to discover information that has been made available in other NAN devices with Publishing, using protocols and mechanisms certified by the Neighbor Awareness Networking program. NAN devices that use Subscribing may passively listen for or actively seek published information.

Publish and Subscribe services are expected to exploit a discovery protocol that the NAN Discovery Engine implements and which is designed for NAN. The protocol is expected to have two different protocol messages: 1) Discovery query message, and 2) Discovery response message. The Subscribe service is expected to use the Discovery query message to conduct active discovery. The Subscribe service may be configured to operate in passive mode only. In this mode, no Discovery query messages are transmitted, but one listens for Discovery response messages to find the information sought. The Publishing service is expected to use the Discovery response message to announce availability of application-selected information to discovering devices.

A device in which the Subscribe service has been activated in active mode, transmits Discovery query messages to trigger Publishing devices to transmit Discovery response messages. In parallel, the Subscribing device monitors received Discovery response messages to determine the availability of services and information being sought. Monitoring is envisioned to be a continuous process that applies to all Discovery response messages received while the Subscribe service is active. With this approach, a Subscribing device may gather valuable information from Discovery response messages that are independent from its own Discovery query message transmissions.

MAC with NAN Support

The MAC is responsible for acquiring and maintaining time and frequency synchronization among devices that are close by, so that the devices are available for discovery protocol message exchange in same channel at same time. Synchronization happens through dedicated synchronization frames that are transmitted by so called master devices (on default) at the beginning of the availability periods. Sync frames are transmitted periodically in certain channels. Periodicity and channel usage is determined by sync frame parameters. Each device needs to be capable of acting as a master device and each device is expected to determine for each availability period whether it is a master device or not.

This determination is done through a master election algorithm. The synchronization frames determine the schedule (time and frequency) of both the synchronization frame transmissions and the availability periods or discovery windows.

A NAN network is comprised of a set of NAN devices that operate under a common network identifier (NAN ID) and that share common sync frame and discovery window parameters. A NAN network comprises of one or more NAN clusters. Each NAN cluster may be a contention group or beacon group and may be considered a local representation of a NAN network. A NAN cluster is comprised of a set of NAN devices that operate in a NAN network with one NAN ID and which are synchronized with respect to both the sync frame transmissions and the discovery windows. In order for NAN devices to form a NAN cluster, at least some of them need to be within range of each other. The NAN ID is carried at least in NAN service discovery frames and may be carried as well in synchronization frames that may be of a beacon frame format. Each NAN service discovery and synchronization frame may also contain a NAN Cluster identifier (ID) field that is used in a NAN device receiving a frame, to determine, as an example, whether the frame is from a NAN network and from a NAN cluster in which the NAN device is operating and from what type of NAN network the frame was transmitted. In one embodiment of the invention, the NAN ID is a numerical value that is indicated with a 6-octet field in NAN service discovery frames used in the NAN networks, to provide service discovery within NAN clusters. In one embodiment of the invention, the NAN Cluster ID is a numerical value that is indicated with a 6-octet field in beacons or in synchronization frames used in the NAN networks, to provide basic synchronization within NAN clusters. In one embodiment of the invention, there is no NAN cluster identifier that would be carried in beacon frames, but NAN cells are differentiated with different schedules especially from perspective of sync frame (beacon) schedule.

The NAN Discovery Engine leverages a variant of the Wi-Fi MAC which has features that have been specifically developed to allow low power discovery directly between devices within range. This MAC with NAN support provides synchronization in addition to frame transmit and receive services. The objective of the synchronization is to make all the NAN devices within range available for service discovery exchange at same time on same frequency channel. The synchronization builds upon Beacon frame transmissions in which all the NAN devices are involved. Beacon frames are transmitted periodically and they serve also as NAN network instance identifiers for devices that look for NAN network instances (NAN cluster is a NAN network instance). A NAN device which looks for a NAN network instance uses traditional Wi-Fi passive scanning by listening for Beacon frames from NAN devices. Typically a NAN device performs passive scanning once in 10-20 seconds and each scan lasts 200-300 ms each. Once a NAN device finds out one or more NAN network instances, it selects the instance to which it synchronizes and starts operating in.

Basic Principles of NAN Operations:
Upon activating the NAN functions in a device, the device first looks for a NAN network by means of passive discovery. The NAN functions are activated by an application in the device requesting either the Subscribe or the Publish service to be activated, when there is no service active in the NAN Discovery Engine.
a) On default there is at least one NAN ID that is determined in a NAN specification and the NAN device looks for such a network and its clusters.

Joining a NAN network/NAN cluster: If the device finds at least one NAN cluster that the device may join, the device selects a cluster and joins it. If the device finds no NAN cluster that the device may join, the device establishes a NAN cluster of its own. An application may have also requested the Publish service to be activated in a passive mode. In such case the device doesn't ever establish a NAN cluster, but it only operates in NAN clusters that have been established by others.
a) A NAN device may join a NAN cluster when the following criterion is met:
1. The device receives at least one sync frame from the cluster with signal level exceeding a pre-determined threshold RSSI_C (e.g. −50 dBm).

Upon joining a NAN cluster a NAN device synchronizes itself both to the sync frame transmission and discovery window schedule of the cluster.
a) Additionally, the device is responsible for running the master election algorithm to determine whether it is a master device that is responsible for transmitting a sync frame.

Once in a NAN cluster, a NAN device may continue operating in it, as long as one of the following criteria is met:
a) The device receives at least one sync frame from the cluster with signal level exceeding a pre-determined threshold RSSI_C (e.g. −50 dBm).
b) The device operates as a master device transmitting sync frames.

When operating in a NAN cluster, a NAN device is responsible for maintaining both the base clock of the cluster by transmitting sync frames as needed and the discovery window schedule of the cluster.

Additionally, a NAN device is responsible for conducting passive discovery once in a while to figure out whether there are other NAN clusters within range that that the device should consider joining
a) When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:
1. If the sync frame from the foreign cluster contains parameter values that indicate preference of the foreign cluster over one's own cluster, the device moves its operations to the foreign cluster.
2. Otherwise the device continues its operations in the current cluster.

Neighbor Awareness Networking Network

A NAN network is comprised of a set of NAN devices that operate under a common network identifier (NAN ID) and that share common sync frame and discovery window parameters.

A NAN network is comprised of one or more NAN clusters.

Cluster

A set of NAN devices that operate in a NAN network with one NAN ID and that are synchronized with respect to both the sync frame transmissions and the discovery windows form a NAN cluster.

In order for NAN devices to form a NAN cluster, at least some of them need to be within range of each other.

Synchronization within a NAN cluster means that the devices share the burden of sync frame transmission and are available simultaneously for NAN discovery during discovery windows.

Sync Frames

Sync frames form the basis of time and frequency synchronization in the NAN network. All the NAN devices are responsible for participating in sync frame transmission, as per master role selection rules.

Sync frames are transmitted as per sync frame parameters that determine how often and in which channel(s) the frames are transmitted.

Sync frames provide a base clock for NAN devices and the base clock is used as the reference when specifying the discovery window schedule.

The base clock builds upon the time synchronization function (TSF) that is used in WLAN, and each sync frame is expected to contain a TSF timestamp value indicator.

A sync frame may be realized as a Beacon frame.

Discovery Window

A discovery window is a time period during which NAN devices are available for NAN discovery frame exchange.

Discovery windows happen as per discovery window parameters that determine how often and in which channel(s) the windows happen.

Discovery window schedule builds upon the information available in sync frames.

Device Operations in a NAN Network

Upon activating the NAN in a device, the device first looks for a NAN network by means of passive discovery.

On default, there is one default NAN ID that is determined in a NAN specification and the NAN device looks for such a network and its clusters.

Joining a NAN Network/NAN Cluster:

If the device finds at least one NAN cluster that the device may join, the device selects a cluster and joins it.

If the device finds no NAN cluster that the device may join, the device establishes a NAN cluster of its own. If the NAN Discovery Engine has been requested to activate the Subscribe service in a passive mode, the device may also decide not to establish a NAN cluster of its own, but it only operates in NAN clusters it discovers.

When a NAN device operates in a NAN cluster, it periodically conducts passive discovery to find out whether other NAN clusters of the NAN network in which the device operates, are available.

Joining a NAN Cluster

A NAN device may join a NAN cluster when the following criterion is met:
  The device receives at least one sync frame from the cluster with signal level exceeding a pre-determined threshold RSSI_C (e.g. −50 dBm).

Upon joining a NAN cluster, a NAN device synchronizes itself both to the sync frame transmission and discovery window schedule of the cluster.

Additionally, the device is responsible for running the master election algorithm to determine whether it is a master device that is responsible for transmitting a sync frame.

Operating in a NAN Cluster

A NAN device may continue operating in a NAN cluster as long as one of the following criteria is met:
  The device receives at least one sync frame from the cluster with signal level exceeding a pre-determined threshold RSSI_C (e.g. −50 dBm).
  The device operates as a master device transmitting sync frames.

When operating in a NAN cluster, a NAN device is responsible for maintaining both the base clock of the cluster by transmitting sync frames as needed, and the discovery window schedule of the cluster.

Master Election

In accordance with an example embodiment of the invention, a node, device, or STA may operate in one of two roles: As a Master STA, it competes with other Master STAs to transmit a Beacon, both for NAN synchronization and NAN discovery purposes. As a Non-Master STA, it may need to compete to transmit a Beacon, but only for NAN synchronization purposes. The Master Sync STA role may be determined by the Master Election Algorithm for Neighbor Awareness Networking. Every node, device, or STA of an ad hoc network may need to be able to operate in both roles and the Master Election Algorithm may need to be run by every node, device, or STA once in a while or periodically.

A NAN device that operates in a NAN cluster may need to be responsible for determining for each discovery window, as per the master election algorithm, whether it is a master device.

A Sync Frame from a Foreign Cluster

When a NAN device detects a sync frame of a NAN cluster different from the one in which the device operates, but both the clusters belong to the NAN network the device operates in, and the sync frame is received with signal level exceeding a pre-determined threshold RSSI_C (e.g. −50 dBm), the device proceeds as follows:
  If the timestamp (e.g. TSF value) in the sync frame from the foreign cluster is larger than the time in one's own cluster, the device moves its operations to the foreign cluster.
  Alternatively some other information in the sync frame from the foreign cluster is analyzed to determine whether the device moves its operations to the foreign cluster.
  Otherwise the device continues its operations in the current cluster.

Moving Operations to a New Cluster

When a NAN device operates in a cluster, it shall do as follows when moving its operations to a new cluster upon detecting the existence of the new cluster through passive discovery:

a) If the device is a master device in the current/old cluster, the rules are as follows:
  The device transmits as a master device in the current/old cluster at least one sync frame that contains information about the new cluster. This includes information at least about TSF value and discovery window schedule of the new cluster.
  Once the device has transmitted at least one sync frame in the current/old cluster with information about the new cluster, it shall start operating in the new cluster and ceases all the operations in the old cluster.

b) If the device is a non-master device in the current/old cluster, the rules are as follows:
  The device shall start operating in the new cluster and ceases all the operations in the old cluster.

D. NAN Discovery With Bluetooth Low Energy

The Bluetooth Low Energy (LE) specification provides means for link layer level device filtering. The link layer (LL) may perform device filtering based on device address of the peer device. LL device filtering is used by the LL to minimize the number of devices to which it responds. Device filtering builds upon concept of white list. A white list contains a set of white list records which each contains both the device address and the device address type (public or random). On reset, the white list is empty. The white list is configured by the host and is used by the LL to filter advertisers, scanners or initiators.

One may deploy filter policies for advertising, scanning and initiating.

The advertising filter policy determines how the advertiser's LL processes scan and/or connection requests. The LL may be configured by the host to one of the following modes:
- To process scan and connection requests only from devices in the white list
- To process scan and connection requests from all devices (i.e. the white list is not in use). This is the default mode on reset.
- To process scan requests from all devices and connection requests only from devices in the white list
- To process connection requests from all devices and scan requests only from devices in the white list The scanner filter policy determines how the scanner's LL processes advertising packets.

The LL may be configured by the host to one of the following modes:
- To process advertising packets only from devices in the white list
- To process advertising packets from all devices (i.e. the white list is not in use). This is the default mode on reset.

As part of the low power discovery solution development one needs to find out how to use the standard Bluetooth LE together with Wi-Fi NAN to find out services in proximity. One possible solution is to use the Bluetooth LE to make NAN as a discovery network discoverable and to allow devices to discover existence of NAN network using the Bluetooth LE advertising and scanning scheme. Once a device recognizes with Bluetooth LE that there is NAN instance available in proximity or a NAN device intending to operate in a NAN network in proximity, the device may decide to activate the Wi-Fi NAN to conduct service discovery.

Wi-Fi NAN is a low power Wi-Fi technology developed for pre-association state service discovery. The power consumption is, however, reasonably high especially from perspective of a NAN device alone and looking for other NAN devices (i.e. looking for NAN networks and NAN clusters). A NAN device which has at least one publish or active subscribe instance active needs to operate in a NAN cluster transmitting NAN Beacon frames and possibly also NAN service discovery frames regardless of number of other NAN devices in the NAN cluster. Additionally, the NAN device needs to periodically scan in order to find out whether there are any other NAN clusters available and whether to join the other NAN cluster instead. While the device is alone all this power is consumed just for making the NAN cluster (i.e. NAN network instance) available for others and to find out whether there are any other NAN clusters in which the device should operate.

In accordance with an example embodiment of the invention, the Bluetooth LE is used to make NAN network and NAN Cluster discoverable, to discover NAN network and NAN Clusters and to allow two devices that are not operating in a NAN Cluster but are looking for NAN Clusters to discover each other and start operating in a NAN Cluster. A NAN Cluster is a local representation of NAN network and thus discovery of a NAN Cluster relates to NAN network discovery. The Bluetooth LE is used in the following manner:
1) A NAN device which doesn't operate in a NAN Cluster uses both the Bluetooth LE advertising and the Bluetooth LE scanning
   - One will be used to "advertise" one's intent to operate in a NAN Cluster
   - The other will be used to discover a NAN Cluster or a NAN device which intends to operate in a NAN Cluster 2) A NAN device which operates in a NAN Cluster uses either the Bluetooth LE advertising or the Bluetooth LE scanning to make NAN network and a NAN Cluster discoverable In accordance with an example embodiment, an identifier is defined for NAN and it is used both in a Bluetooth LE scanner and in a Bluetooth LE advertiser as the device address. Additionally, in accordance with an example embodiment of the invention, device filtering is used with the NAN identifier based device addresses in the Bluetooth LE link layer (LL) both in the scanner and in the advertiser, when the Bluetooth LE is used to make NAN network and a NAN cluster discoverable and to discover NAN network and NAN clusters.

The combination of NAN identifier usage as the device address and use of device filtering with the NAN identifier based device addresses allows for NAN network and NAN cluster discovery to happen on the Bluetooth LE LL. With this approach a Bluetooth LE scanning device may be configured to transmit SCAN_REQ PDUs per NAN identifier in received ADV_IND/ADV_SCAN_IND PDUs. Similarly, a Bluetooth LE advertising device can be configured to transmit SCAN_RSP PDUs per NAN identifier in received SCAN_REQ PDUs. Thus the Bluetooth LE can be used very effectively in NAN network and NAN cluster discovery.

Basic Operating Principles

In accordance with an example embodiment of the invention, a device with both NAN and Bluetooth LE capability uses Bluetooth LE advertising and Bluetooth LE scanning per the following principles depending on whether it operates in a NAN Cluster or not:

1) A NAN device which has at least one active subscribe or publish instance active doesn't operate in a NAN Cluster uses the Bluetooth LE advertising to advertise intent to operate in NAN network and in a NAN Cluster and the Bluetooth LE scanning to discover NAN network and a NAN Cluster or a NAN device which intends to operate in a NAN Cluster.

2) A NAN device which operates in a NAN Cluster uses the Bluetooth LE advertising to advertise the NAN Cluster.

Alternatively a NAN device which doesn't operate in a NAN Cluster uses the Bluetooth LE scanning to make itself and its intent to operate in a NAN Cluster discoverable and the Bluetooth LE advertising to discover a NAN Cluster or a NAN Device which intends to operate in a NAN Cluster.

When a NAN Device which doesn't operate in a NAN Cluster detects a NAN Cluster or another device which intends to operate in a NAN Cluster, it activates its NAN Wi-Fi in order to start operating in a NAN Cluster. If may first look for a NAN Cluster and if it finds one, it starts operating in it. If the NAN device doesn't find a NAN Cluster, it may start a new one.

When a NAN device has started operating in a NAN Cluster, it may cease using the Bluetooth LE scanning (preferred implementation) or the Bluetooth LE advertising (alternative implementation). A NAN device may continue using the Bluetooth LE advertising or the Bluetooth LE scanning as the mechanism to make NAN network and the NAN Cluster discoverable until the device specific rules make the NAN device to cease the advertising/scanning. A NAN device may decide to cease using the Bluetooth LE for NAN network and NAN Cluster discoverability purposes when, as an example, estimated number of neighbor NAN devices exceeds a predefined threshold.

Device Address Usage with NAN Identifier

In accordance with an example embodiment of the invention, the Bluetooth LE's non-resolvable private address format (FIG. 3) is used in AdvA and ScanA fields of the ADV_IND, ADV_SCAN_IND, SCAN_REQ and SCAN_RSP PDUs respectively. The same format is used also in the white list to determine to which transmissions from a peer device one responds. At least a portion of the 46 bit random part of non-resolvable address is set to according to the NAN identifier.

In accordance with an example embodiment of the invention, the NAN identifier is the NAN network identifier specified in the Wi-Fi Alliance's NAN technical specification. The NAN network ID is expected to be defined as the MAC address 51-6F-9A-XX-XX-XX-00-00 where the XX-XX-XX will be defined by the Wi-Fi Alliance. Another possibility is to use the service identifier approach and to reserve a service name (e.g. org.wi-fi.nan) for NAN networking "service". In that case all the NAN clusters would be represented with one SID which is the result of a predefined hash function when the input is the service name dedicated for the NAN.

In accordance with an example embodiment of the invention, (FIG. 4A) all the 46 bits of the random part are used per the NAN identifier, i.e. the 46 least or the 46 most significant bits of the NAN identifier are used as the 46 random bits of the non-resolvable private address. Another embodiment (FIG. 4B) is to use e.g. 2 bits of the 46 bit random part of non-resolvable address to indicate whether one is operating in a NAN cluster or looking for one and the remaining bits (e.g. 44 bits) are used per the NAN identifier (either the least or the 44 most significant bits of the NAN identifier are used as the 44 random bits of the non-resolvable private address).

Information in AdvData/ScanRspData field of an ADV_IND/ADV_SCAN_IND/SCAN_RSP PDU (FIG. 5)

When the device address may indicate only a portion (46 or 44 bits of the 48 bits, as examples) of the NAN identifier, there is an increased probability of false matches (i.e. a partial NAN identifier matches with a device address even if the complete NAN identifier would be different). In accordance with an example embodiment of the invention, one may alleviate this problem by having the remaining bits (2 or 4, as examples) of the NAN identifier included in the AdvData field of an ADV_IND/ADV_SCAN_IND PDU or in the ScanRspData field of a SCAN_RSP PDU. When this feature is implemented, a Bluetooth LE advertiser includes those bits of the NAN identifier that are not carried in the AdvA field to the AdvData or ScanRspData field of a transmitted PDU. A Bluetooth LE scanner may combine these bits with those bits in the AdvA field that contain a portion of the NAN identifier to form the complete NAN identifier to verify that the message is really either a presence indication of a NAN cluster or query on a NAN cluster.

If the remaining bits are carried in an ADV_IND/ADV_SCAN_IND PDU, they are useful mostly in a device which uses passive scanning. A passively scanning device may gather information from received advertising PDUs and combine e.g. the 44/46 bits of the AdvA field and the 4/2 bits of the AdvData field to a complete NAN identifier. Actively scanning device is not able to use the remaining bits in the AdvData field of a received ADV_IND/ADV_SCAN_IND PDU to decide whether to transmit a SCAN_REQ PDU to the advertising device but the decision is made based upon the content of the AdvA field and the scanner's filter policy and the scanner's white list.

When the remaining bits are carried in a SCAN_RSP PDU, they may be used in the scanning device to verify that the complete NAN identifier from the advertising device and the NAN identifier used by the scanning device matches.

With these methods a scanning device can filter out those advertisers which operate with same partial NAN identifier as the scanner but whose complete NAN identifier is different from the scanner's complete NAN identifier.

AdvData/ScanRspData field may contain also service specific data which is intended to be carried to the host when a NAN identifier match happens. AdvData/ScanRspData may contain also one of more SIDs that represent the published/subscribed services and each SID may contain also an indication of whether the SID is related to publish or subscribe or both. Additionally, AdvData/ScanRspData may contain one or more identifiers of the NAN networks or one or more identifiers of the NAN clusters in which the advertiser operates.

NAN Device is Bluetooth LE advertiser a) In accordance with an example embodiment of the invention, a NAN device uses Bluetooth LE advertising and transmits ADV_IND/ADV_SCAN_IND PDUs with the AdvA field set to indicate the NAN identifier. Additionally, the LL is configured to operate with the advertising filter policy in which the LL processes scan and connection requests only from devices in the white list. The white list is configured to contain the portion of the NAN identifier which can be carried in the AdvA field. If the address fields (AdvA, ScanA) of advertising channel PDUs are configured to contain indication of message type (NAN Cluster available, NAN Cluster query), the white list is configured to contain value indicative either of NAN Cluster query (the Bluetooth LE advertising is used for NAN Cluster discovery) or of NAN Cluster available (the Bluetooth LE advertising is used to make a NAN Cluster discoverable).

i. Depending on the device address usage scheme (see above), the AdvA is configured to contain either only a portion of the NAN identifier or a portion of the NAN identifier and indication of message type (NAN Cluster available, NAN Cluster query).

ii. Depending on the AdvData usage scheme (see above), the AdvData field is configured either not to exist or to contain at least one of the following: 1) remaining bits of the NAN identifier, 2) list of SIDs, 3) indication of whether the SID is related to publish or/and subscribe, 4) service specific info, 5) list of NAN Cluster IDs.

b) The NAN device transmits a SCAN_RSP PDU upon receiving a SCAN_REQ PDU in which the ScanA is equal to a record in the white list.

i. Depending on the device address usage scheme (see above), the AdvA is configured to contain either only a portion of the NAN identifier or a portion of the NAN identifier and indication of the message type ii. Depending on the ScanRspData usage scheme (see above), the ScanRspData field is configured either not to exist or to contain at least one of the following: 1) remaining bits of the NAN identifier, 2) list of SIDs, 3) indication of whether the SID is related to publish or/and subscribe, 4) service specific info, 5) list of NAN Cluster IDs.

iii. The link layer may provide the ScanA field content of received SCAN_REQ PDUs to the host which processes them from the perspective of NAN Cluster discovery looking for matches between the NAN identifiers in received SCAN_REQ PDUs and the NAN identifier the device itself uses.

NAN Device is Bluetooth LE Scanner a) In accordance with an example embodiment of the invention, a NAN device uses Bluetooth LE scanning and transmits a SCAN_REQ PDU with the ScanA field set to indicate the NAN identifier upon receiving an ADV_IND/ADV_SCAN_IND PDU in which the ScanA is equal to a record in the white list. Additionally, the LL is configured to operate with the scanning filter policy in which the LL processes advertising packets only from devices in the white list. The white list is configured to contain the portion of the NAN identifier which can be carried in the ScanA field. If the address fields (AdvA, ScanA) of advertising channel PDUs are configured to contain indication of message type (NAN Cluster available, NAN Cluster query), the white list is configured to contain value indicative either of NAN Cluster query (the Bluetooth LE scanning is used to make a NAN Cluster discoverable) or of NAN Cluster available (the Bluetooth LE scanning is used for NAN Cluster discovery).

i. Depending on the device address usage scheme (see above), the ScanA is configured to contain either only a portion of the NAN identifier or a portion of the NAN identifier and indication of message type (NAN Cluster available, NAN Cluster query).

b) Upon receiving a SCAN_RSP PDU from a device to which the NAN device transmitted a SCAN_REQ PDU, the device, depending on the ScanRspData usage scheme (see above), may verify whether the complete NAN identifier from the received SCAN_RSP matches with the NAN identifier used by the NAN device and notify the host upon a match. If the SCAN_RSP PDU contains some payload like SID list, NAN Cluster ID list and service specific info, it may be passed to the host upon (complete) NAN identifier match. The NAN Cluster ID list, as an example, may be used in WLAN scanning to look for specific NAN Clusters.

FIG. 1 illustrates an example network diagram of a Bluetooth Low Energy (LE) wireless device 110 functioning as an advertiser and being a member of a neighbor awareness network (NAN) 50. Bluetooth Low Energy (LE) wireless device 110 is shown broadcasting the Bluetooth LE connectable undirected advertising (ADV_IND) channel packet ADV_IND PDU 140 advertising the NAN identity (ID) of the advertiser. The Bluetooth LE wireless device 110 assigns the specified NAN ID to the AdvA field of the ADV_IND PDU. The non-resolvable private address format in the AdvA field of ADV_IND PDU, is set to the NAN ID. The Bluetooth LE wireless device 110 then broadcasts the ADV_IND PDU to the Bluetooth LE wireless devices 100, 100', and 100". The Bluetooth LE wireless device 100 is shown functioning as a NAN scanner. The Bluetooth LE wireless device 100 is shown filtering the AdvA field of received ADV_IND PDU and determining any match with a NAN network that it may seek, in accordance with at least one embodiment of the present invention.

FIG. 1A is an example functional block diagram of the Bluetooth Low Energy (LE) wireless device 110 functioning as an advertiser. Bluetooth Low Energy (LE) wireless device 110 is shown broadcasting the Bluetooth LE connectable undirected advertising (ADV_IND) channel packet 140 advertising the NAN identity (ID) of the advertiser 110. (The Bluetooth Low Energy (LE) wireless device 110 may alternately broadcast a scannable undirected advertising (ADV_SCAN_IND) channel packet.) The Bluetooth LE wireless device 110 assigns the specified NAN ID to the AdvA field of the ADV_IND PDU. The non-resolvable private address format in the AdvA field of ADV_IND PDU, is set to the NAN ID. The Bluetooth LE wireless device 110 then broadcasts the ADV_IND PDU to the Bluetooth LE wireless device 100 that is shown functioning as a NAN scanner. The Bluetooth LE wireless device 100 is shown filtering the AdvA field of received ADV_IND PDU and determining any match with a NAN network that it may seek, in accordance with at least one embodiment of the present invention.

The ADV_IND PDU has a payload field containing both the AdvA address field and the AdvData field. When the device address may indicate only a portion (46 or 44 bits of the 48 bits, as examples) of the NAN ID, there is an increased probability of false matches (i.e. two partial NAN IDs match, even if the complete NAN IDs would be different). In accordance with an example embodiment of the invention, the remaining bits (2 or 4, as examples) of the NAN ID may be included in the AdvData field of the ADV_IND. When this feature is implemented, a Bluetooth LE advertiser 110 may include in the AdvData, those bits of the NAN ID that are not carried in the AdvA field of a transmitted PDU. The Bluetooth LE scanner 100 may combine these bits in the AdvData field with those bits in the AdvA field that contain a portion of the NAN ID, to form the complete NAN ID, enabling the scanner 100 to verify that there really is a match between the NAN ID received from the advertising device 110 and the scanner's NAN ID.

If the remaining bits are carried in an ADV_IND PDU, they are useful in a device that uses passive scanning to determine NAN networks that are in operation within range. A passively scanning device may gather information from received advertising PDUs and combine e.g. the 44/46 bits of the AdvA field and the 4/2 bits of the AdvData field to form a complete NAN ID. An actively scanning device may not be able to use the remaining bits in the AdvData field of a received ADV_IND to decide whether to transmit a SCAN_REQ PDU to the advertising device, but the decision may be made based upon the content of the AdvA field and the scanner's filter policy and its white list. In this manner, the scanning device may filter out those advertisers that operate with the same partial NAN ID as stored in the scanner, but whose complete NAN ID is different from the scanner's complete NAN ID.

AdvData field may also contain NAN network specific data that is intended to be carried to the host of the scanner device when a NAN ID match happens. The AdvData field may also contain one or more NAN IDs of available NAN networks or one or more NAN cluster IDs of available NAN clusters that may be used in the scanner device that uses passive scanning to determine NAN networks that are in operation within range.

Alternatively the Bluetooth Low Energy (LE) wireless device 110 that functions as an advertiser, may send a Bluetooth LE scannable undirected advertising (ADV_SCAN_IND) channel packet advertising that a specified NAN ID is available from the advertiser 110.

In an example embodiment of the invention, the wireless device 100 and the wireless device 110 may be a communications device, PDA, cell phone, laptop or palmtop computer, or the like or it may be a stationary access point, automotive dashboard interface, home electronics interface or other stationary interface or device. The wireless device 110 and the wireless device 100 may be a remote controller, healthcare monitor, sports sensor, token, key fob, watch, wireless keyboard, gaming pad, body sensor, toy, health care equipment, human interface device, entertainment device, wireless microphone, GPS sensor, or the like.

In an example embodiment of the invention, the wireless device 110 and the wireless device 100 may include a processor 220 that includes a single core or multi-core central processing unit (CPU) 260 and 261, a random access memory (RAM) 262, a read only memory (ROM) 264, and interface circuits 266 to interface with the radio transceiver 208. The wireless device 110 and the wireless device 100 may each further include a battery and other power sources, key pad, touch screen, display, microphone, speakers, ear pieces, camera or other imaging devices, etc. The RAM 262 and ROM 264 may be removable memory devices such as smart cards, SIMs, WIMs, semiconductor memories such as RAM, ROM, PROMS, flash memory devices, etc. according to an embodiment of the present invention. According to an example embodiment of the invention, the wireless device 110 and the wireless device 100 each include the awareness protocol stack 202.

In an example embodiment of the invention, the awareness protocol stack 202 may include the NAN discovery engine 205 and the MAC with NAN support 210. In an example embodiment of the invention, the awareness protocol stack 202 may include an Awareness Layer, Community Layer, Network Layer, and Link Layer. In an example embodiment of the invention, the awareness protocol stack 202 may include the Bluetooth LE protocol stack 215.

In an example embodiment of the invention, the processor 220, protocol stack 202 and/or application program 200 may be embodied as program logic stored in the RAM 262 and/or ROM 264 in the form of sequences of programmed instructions which, when executed in the CPUs 260 and/or 261, carry out the functions of the disclosed embodiments. The program logic may be delivered to the writeable RAM, PROMS, flash memory devices, etc. 262 of the wireless device 110 and the wireless device 100 from a computer program product or article of manufacture in the form of computer-usable media such as resident memory devices, smart cards or other removable memory devices, as illustrated in FIG. 8. Alternately, they may be embodied as integrated circuit logic in the form of programmed logic arrays or custom designed application specific integrated circuits (ASIC). The radio 208 in the each of the wireless device 110 and the wireless device 100 may be separate transceiver circuits or alternately, the radio 208 may be a single radio module capable of handling one or multiple channels in a high speed, time and frequency multiplexed manner in response to the processor 220. The program code for instructing the apparatus to perform its various operations may be stored in computer readable media, for example magnetic disks, CD ROMS, or flash memory devices. The program code may be downloaded from such computer readable media to be stored for example in the RAM 262 or programmable ROM 264 of the wireless device 110 and the wireless device 100 for execution of the program code for example by the CPUs 260 and/or 261. Removable storage media 126 are shown in FIG. 8.

In an example embodiment of the invention, the Bluetooth LE wireless device 110 buffers the specified neighbor awareness network (NAN) identity to be advertised, in the buffer 151. The Bluetooth LE wireless device 110 assigns the specified neighbor awareness network (NAN) identity to the AdvA field of the ADV_IND PDU in block 142'. The non-resolvable private address format in the AdvA field of ADV_IND PDU, is set to the neighbor awareness network (NAN) identity to be advertised. The Bluetooth LE wireless device 110 then broadcasts the ADV_IND PDU to the Bluetooth LE wireless devices 100, 100', and 100" functioning as NAN scanners.

In an example embodiment of the invention, the Bluetooth LE wireless device 100 has previously buffered the neighbor awareness network (NAN) identity that it is seeking, in buffer 150. The Bluetooth LE wireless device 100 filters the AdvA field of the received ADV_IND PDU and determines whether there is any match with the buffered neighbor awareness network (NAN) identity it is seeking, in block 153'.

FIG. 1B is an example functional block diagram of the Bluetooth LE wireless device 100 functioning as a NAN scanner. If the filtering of AdvA field of received ADV_IND PDU 140 in FIG. 1A determines that there is a match, then the scanner 100 sends a Bluetooth LE SCAN_REQ PDU 140' including the NAN ID on which the match occurred, in the ScanA field of the SCAN_REQ PDU 140', indicating the scanner 100 is seeking the NAN ID, in Bluetooth LE active scanning. The Bluetooth LE wireless device 100 assigns the specified NAN ID to the ScanA field of the SCAN_REQ PDU 140'. The non-resolvable private address format in the ScanA field of SCAN_REQ PDU, is set to the NAN ID it is seeking. The Bluetooth LE wireless device 100 then transmits the SCAN_REQ PDU to the Bluetooth LE wireless device 110 functioning as the NAN advertiser. The Bluetooth LE wireless device 110 has previously buffered the NAN ID of the network of which it is a member. The Bluetooth LE wireless device 110 filters the ScanA field of the received SCAN_REQ PDU 140' and determines whether there is any match with the buffered NAN ID, in accordance with at least one embodiment of the present invention.

FIG. 1C is an example functional block diagram of the Bluetooth Low Energy (LE) wireless device 110 functioning as an advertiser and the Bluetooth LE wireless device 100 functioning as a NAN scanner. If the filtering of the ScanA field of received SCAN_REQ PDU 140' in FIG. 1B determines that there is a match, then the advertiser 110 sends a Bluetooth LE SCAN_RSP PDU 140" including the NAN ID on which the match occurred, in the AdvA field of the SCAN_RSP PDU 140", providing information about the NAN network. The Bluetooth LE wireless device 110 assigns the specified NAN ID to the AdvA field of the SCAN_RSP PDU 140". The non-resolvable private address format in the AdvA field of SCAN_RSP PDU, is set to the NAN ID of the NAN network available or in which one intends to operate. The Bluetooth LE wireless device 110 then transmits the SCAN_RSP PDU 140" to the Bluetooth LE wireless device 100 functioning as the NAN scanner. The scanner 100 receives the information about the NAN network in the Bluetooth LE SCAN_RSP PDU including the NAN ID in the AdvA field of SCAN_RSP PDU, identifying the NAN network.

FIG. 1D illustrates an example network diagram of a Bluetooth Low Energy (LE) wireless device 110 functioning as an advertiser. Bluetooth Low Energy (LE) wireless device 110 is not currently operating in the NAN network 50, but it uses Bluetooth LE advertising when it intends to later operate in the NAN network 50, in accordance with at least one embodiment of the present invention. Bluetooth LE advertising may be available when the Bluetooth Low Energy (LE) wireless device 110 is not yet in a NAN network, but intends to operate in one. Bluetooth Low Energy (LE) wireless device 110 would use the Bluetooth LE advertising as if it were operating in a NAN network and upon detecting another device looking for a NAN network, the Bluetooth Low Energy (LE) wireless device 110 would activate the NAN. By contrast, if the Bluetooth Low Energy (LE) wireless device 110 were already in a NAN network, it would not need to activate the NAN.

Figure 2A:
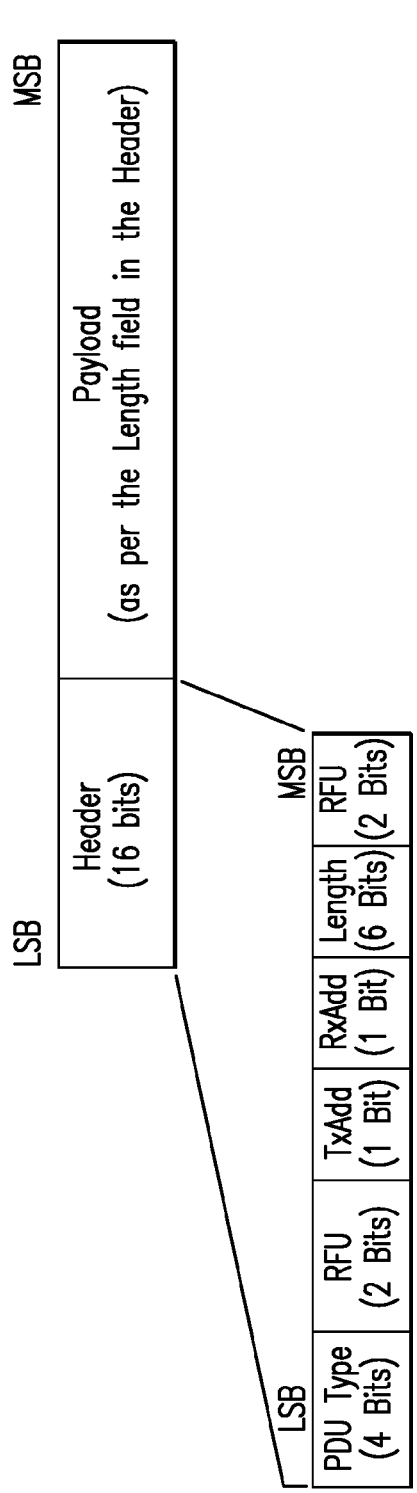
FIG. 2A illustrates the example formats of Bluetooth LE advertising channel PDUs.

FIG. 2A illustrates the formats of Bluetooth LE advertising channel PDUs.

The ADV_IND PDU has the Payload as shown in FIG. 2A. The PDU shall be used in connectable undirected advertising events. The TxAdd in the Flags field indicates whether the advertiser's address in the AdvA field is public (TxAdd=0) or random (TxAdd=1). The Payload field consists of AdvA and AdvData fields. The AdvA field shall contain the advertiser's public or random device address as indicated by PDU Type TxAdd. The AdvData field may contain Advertising Data from the advertiser's Host.

The ADV_SCAN_IND PDU has the Payload as shown in FIG. 2A. The PDU shall be used in scannable undirected advertising events. The TxAdd in the Flags field indicates whether the advertiser's address in the AdvA field is public (TxAdd=0) or random (TxAdd=1). The Payload field consists of AdvA and AdvData fields. The AdvA field shall contain the advertiser's public or random device address as indicated by TxAdd. The AdvData field may contain Advertising Data from the advertiser's Host.

The SCAN_REQ PDU has the Payload as shown in FIG. 2A. The TxAdd in the Flags field indicates whether the scanner's address in the ScanA field is public (TxAdd=0) or random (TxAdd=1). The RxAdd in the Flags field indicates whether the advertiser's address in the AdvA field is public (RxAdd=0) or random (RxAdd=1). The Payload field consists of ScanA and AdvA fields. The ScanA field shall contain the scanner's public or random device address as indicated by TxAdd. The AdvA field is the address of the device to which this PDU is addressed.

The SCAN_RSP PDU has a format as shown in FIG. 2A. The TxAdd in the Flags field indicates whether the advertiser's address in the AdvA field is public (TxAdd=0) or random (TxAdd=1). The Length field indicates the size of the payload (AdvA and ScanRspData) in octets. The Payload field consists of AdvA and ScanRspData fields. The AdvA field shall contain the advertiser's public or random device address as indicated by TxAdd. The ScanRspData field may contain any data from the advertiser's Host.

FIG. 2B illustrates the formats of Bluetooth LE connectable undirected and scannable undirected advertising events. Connectable undirected events allow for active scanning and connection requests. Scannable undirected events allow for active scanning, but disallow connection requests.

A connectable undirected advertising event is shown with SCAN_REQ and SCAN_RSP PDUs in the middle of an advertising event.

A connectable undirected advertising event is shown during which a CONNECT_REQ PDU is received.

A scannable undirected advertising event is shown with SCAN_REQ and SCAN_RSP PDUs in the middle of an advertising event.

Figure 3:
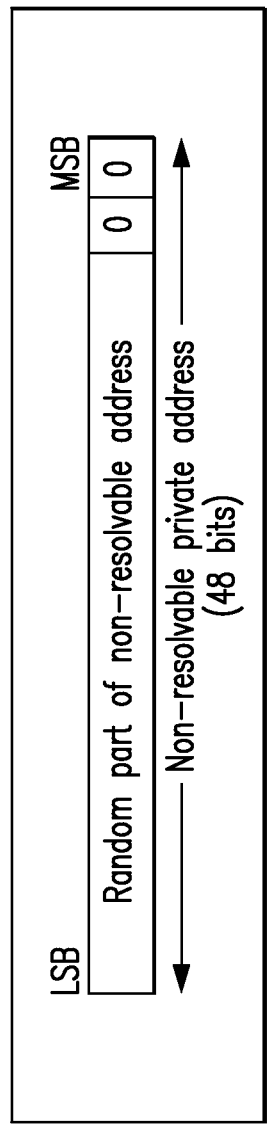
FIG. 3 illustrates in an example embodiment of the invention, the use of non-resolvable private address to carry the NAN ID in SCAN_REQ PDUs. In an example embodiment, the non-resolvable private address format is used in the ScanA field of the SCAN_REQ PDUs when the Bluetooth LE active scanning is used for NAN network discovery purposes. The 46 bit random part of the Bluetooth LE non-resolvable address, is set to according to the NAN ID one is either looking for (subscribe) or advertising (publish). Either the 46 least significant bits or the 46 most significant bits of the NAN ID are used as the 46 random bits of the Bluetooth LE non-resolvable private address, in accordance with at least one embodiment of the present invention.

FIG. 3: illustrates in an example embodiment of the invention, the use of non-resolvable private address to carry the neighbor awareness network (NAN) identity in SCAN_REQ PDUs. In an example embodiment, the non-resolvable private address format is used in the ScanA field of the SCAN_REQ PDUs when the Bluetooth LE active scanning is used for NAN discovery purposes. The 46 bit random part of the Bluetooth LE non-resolvable address, is set to according to the neighbor awareness network (NAN) identity of the NAN network one is either looking for (seek) or indicating as available (advertise). Either the 46 least significant bits or the 46 most significant bits of the neighbor awareness network (NAN) identity are used as the 46 random bits of the Bluetooth LE non-resolvable private address, in accordance with at least one embodiment of the present invention.

Figure 4A:
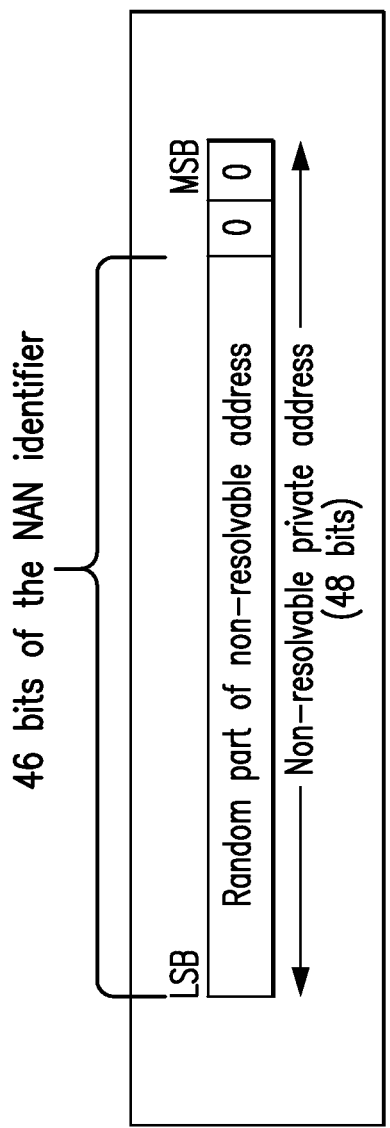
FIG. 4A illustrates an example of the Address field content option. The 46 bit random part of non-resolvable address is set to according to the NAN ID of the NAN network one is either looking for (seek) or indicating available (advertise). Either the 46 least or the 46 most significant bits of the NAN ID are used as the 46 random bits of the non-resolvable private address.

FIG. 4A illustrates an example of the Address field content option. The 46 bit random part of non-resolvable address is set to according to the neighbor awareness network (NAN) identity of the NAN network one is either looking for (seek) or indicating as available (advertise). Either the 46 least or the 46 most significant bits of the neighbor awareness network (NAN) identity are used as the 46 random bits of the non-resolvable private address.

FIG. 4B illustrates an example of the Address field content option. A 44 bit random part of non-resolvable address is set to according to the neighbor awareness network (NAN) identity of the NAN network one is either looking for (seek) or indicating as available (advertise). Either the 44 least or the 44 most significant bits of the neighbor awareness network (NAN) identity are used as the 44 random bits of the non-resolvable private address. 2 bits of the address is used to indicate whether the neighbor awareness network (NAN) identity relates to seek or advertise.

FIG. 5 illustrates an example of the AdvData/ScanRspData content. The top format may be used with the scheme in FIG. 4A. The bottom format may be used with the scheme in FIG. 4B. The AdvData/ScanRspData field may also contain one or more NAN IDs that relate to one or more advertised NAN networks or NAN clusters of the NAN network indicated with the address field.

Bluetooth LE Advertising Device Advertising NAN Network

A Bluetooth LE advertising device operating in a NAN network and in at least one NAN network or intending to operate in a NAN network, uses Bluetooth LE advertising and transmits ADV_IND/ADV_SCAN_IND PDUs with the AdvA field set to indicate the NAN ID of the NAN network in which it operates or in which it intends to operate.

FIG. 6A is an example flow diagram 300 of operational steps of the Bluetooth LE advertising device 110 operating in NAN network or intending to operate in NAN network, sending a Bluetooth LE ADV_IND or ADV_SCAN_IND PDU seeking to advertise that NAN network associated with a NAN ID specified in the AdvA field of the ADV_IND/ADV_SCAN_IND PDU, is available or will be available from the advertiser 110, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302 inserting, by an apparatus, an indication associated with a neighbor awareness network to be advertised to an apparatus address field of a wireless advertisement packet (for example an ADV_IND PDU advertisement packet); and Step 304: transmitting, by the apparatus, the wireless advertisement packet including the inserted indication associated with the neighbor awareness network to be advertised.

The wireless advertisement packet may comprise either a Bluetooth Low Energy ADV_IND PDU packet or a Bluetooth Low Energy ADV_SCAN_IND PDU packet.

The apparatus address field may be a non-resolvable private address format in an AdvA field of either the Bluetooth Low Energy ADV_IND PDU packet or the Bluetooth Low Energy ADV_SCAN_IND PDU packet.

FIG. 6B is an example flow diagram 305 of operational steps of the Bluetooth LE advertising device 110 operating in NAN network or intending to operate in NAN network. The advertising device 110 follows the steps of the flow diagram 300 of FIG. 6A, broadcasting a Bluetooth LE ADV_IND or ADV_SCAN_IND PDU advertising packet seeking to advertise that NAN network associated with a NAN ID specified in the AdvA field of the ADV_IND/ADV_SCAN_IND PDU, is available or will be available from the advertiser 110. The Bluetooth LE wireless device 110, functioning as an advertiser, receives a response to the advertising packet, by receiving a wireless, discovery request packet, such as a Bluetooth LE SCAN_REQ PDU, requesting the NAN network identified by the NAN ID. The received wireless request packet includes the NAN ID indication associated with the requested NAN network in the sender's address field, such as the ScanA field. In response to receiving the wireless discovery request packet, the Bluetooth LE wireless device 110 functioning as an advertiser, may filter the received NAN ID indication in the SCAN_REQ PDU to determine whether there is any match of the received NAN ID indication with one or more NAN identities of NAN networks available from the advertising device 110. The Bluetooth LE wireless device 110, functioning as an advertiser, transmits a wireless discovery response packet, such as a Bluetooth LE SCAN_RSP PDU, in response to the received wireless discovery request packet, including the NAN ID indication on which the match occurred, if the filtering determines that there is a match.

The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 302 inserting, by an apparatus, an indication associated with a neighbor awareness network to be advertised to an apparatus address field of a wireless advertisement packet (for example an ADV_IND PDU advertisement packet);

Step 304: transmitting, by the apparatus, the wireless advertisement packet including the inserted indication associated with the neighbor awareness network to be advertised;

Step 306: receiving, by the apparatus, one or more wireless discovery request packets (for example, a SCAN_REQ PDU discovery request packet) in response to the transmitted wireless advertisement packet;

Step 308: determining, by the apparatus, whether any of the received wireless discovery request packets matches with one or more neighbor awareness networks to be advertised by filtering sender address field indication of each of the received one or more wireless discovery request packets with identities corresponding with the one or more neighbor awareness networks to be advertised; and Step 310: transmitting, by the apparatus, a wireless discovery response packet (for example, a SCAN_RSP PDU discovery response packet) in response to the received wireless discovery request packet including an indication associated with the neighbor awareness network on which the determination resulted in a match.

Figure 6C:
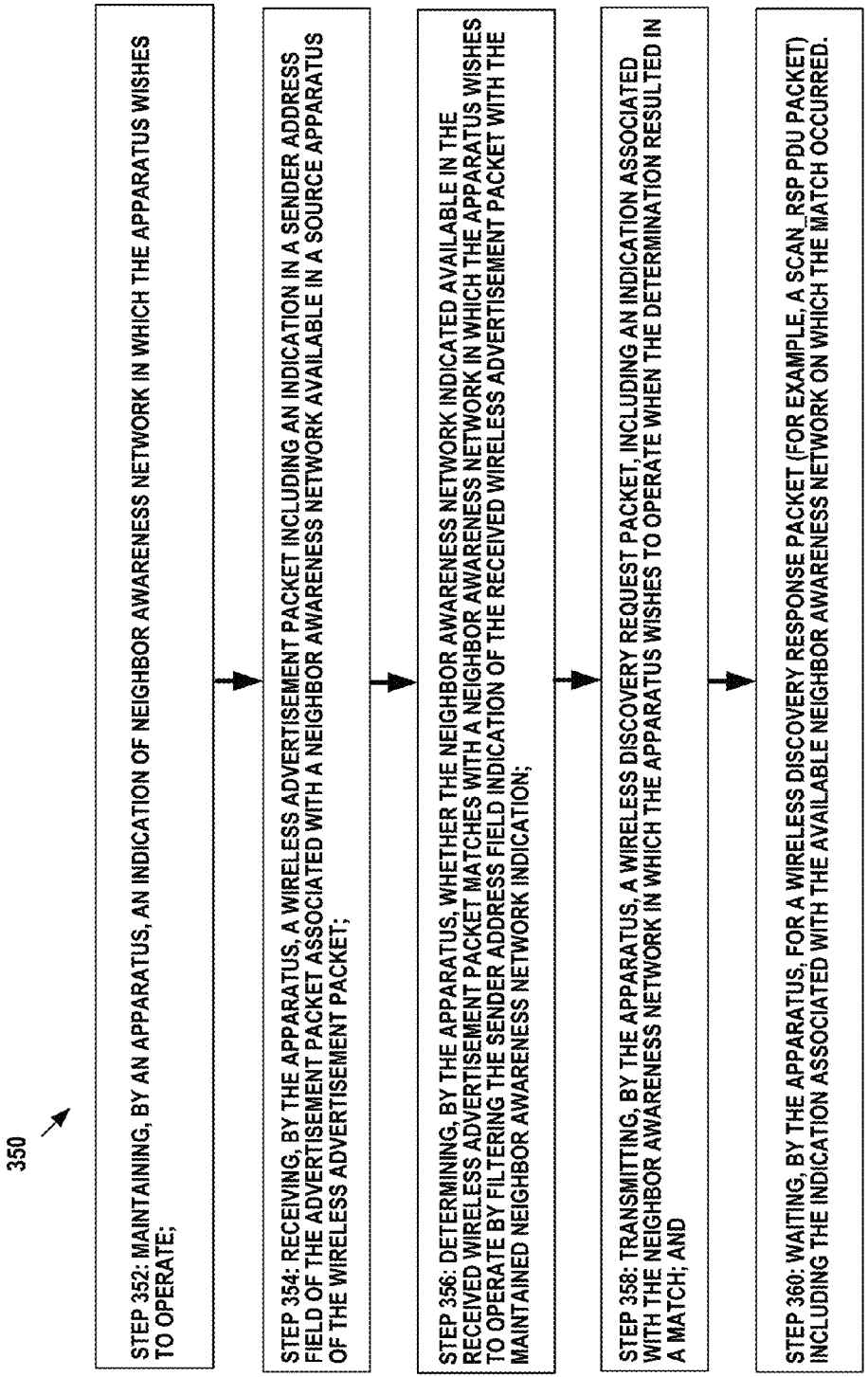
FIG. 6C is an example flow diagram 350 of operational steps of the Bluetooth LE scanning device 100 of FIG. 6B looking for a NAN network. If the filtering determines that there is a match, the Bluetooth LE wireless device 100 prepares a wireless discovery request packet, SCAN_REQ PDU, to be transmitted including the indication associated with the advertised NAN network on which the match occurred, in accordance with at least one embodiment of the present invention.

FIG. 6C is an example flow diagram 350 of operational steps of the Bluetooth LE scanning device 100 looking for NAN network and NAN clusters. The device has previously buffered the NAN IDs of the NAN networks it may require. The Bluetooth LE wireless device 100 filters and analyzes the AdvA field of the received ADV_IND or ADV_SCAN_IND PDU and determines whether there is any match with the buffered NAN IDs, for NAN discovery. If the filtering determines that there is a match, the Bluetooth LE wireless device 100 prepares a wireless discovery request packet, SCAN_REQ PDU, to be transmitted including the indication associated with the advertised NAN network on which the match occurred, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 352: maintaining, by an apparatus, an indication of neighbor awareness network in which the apparatus wishes to operate;

Step 354: receiving, by the apparatus, a wireless advertisement packet including an indication in a sender address field of the advertisement packet associated with a neighbor awareness network available in a source apparatus of the wireless advertisement packet;

Step 356: determining, by the apparatus, whether the neighbor awareness network indicated available in the received wireless advertisement packet matches with a neighbor awareness network in which the apparatus wishes to operate by filtering the sender address field indication of the received wireless advertisement packet with the maintained neighbor awareness network indication;

Step 358: transmitting, by the apparatus, a wireless discovery request packet, including an indication associated with the neighbor awareness network in which the apparatus wishes to operate when the determination resulted in a match; and Step 360: waiting, by the apparatus, for a wireless discovery response packet (for example, a SCAN_RSP PDU packet) including the indication associated with the available neighbor awareness network on which the match occurred.

The wireless advertisement packet may comprise either a Bluetooth Low Energy ADV_IND PDU packet or a Bluetooth Low Energy ADV_SCAN_IND PDU packet.

The sender address field may be a non-resolvable private address format in an AdvA field of either the Bluetooth Low Energy ADV_IND PDU packet or the Bluetooth Low Energy ADV_SCAN_IND PDU packet.

After filtering the NAN ID in the address field with the stored NAN ID values, if there is a match either in the advertiser or in the scanner, the apparatus may consider the match as an indication of need for further action, for example, activation of Wi-Fi NAN for publishing or subscribing purposes.

Bluetooth LE Advertising Device Seeking NAN Network

A Bluetooth LE advertising device seeking for NAN network and NAN clusters, uses Bluetooth LE advertising and transmits ADV_IND/ADV_SCAN_IND PDUs with the AdvA field set to indicate the NAN ID of a NAN network in which it wishes to operate.

FIG. 7A is an example flow diagram 400 of operational steps of the Bluetooth LE advertising device 110 seeking a NAN network, sending a Bluetooth LE ADV_IND or ADV_SCAN_IND PDU seeking to discover a NAN ID available from another device, having a NAN ID specified in the AdvA field of the ADV_IND/ADV_SCAN_IND PDU, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 402 inserting, by an apparatus, an indication associated with a required neighbor awareness network to an apparatus address field of a wireless advertisement packet (for example an ADV_IND PDU advertisement packet); and Step 404: transmitting, by the apparatus, the wireless advertisement packet including the inserted indication associated with the required neighbor awareness network.

The wireless advertisement packet may comprise either a Bluetooth Low Energy ADV_IND PDU packet or a Bluetooth Low Energy ADV_SCAN_IND PDU packet.

The apparatus address field may be a non-resolvable private address format in an AdvA field of either the Bluetooth Low Energy ADV_IND PDU packet or the Bluetooth Low Energy ADV_SCAN_IND PDU packet.

FIG. 7B is an example flow diagram 405 of operational steps of the Bluetooth LE advertising device 110 seeking a NAN network. The advertising device 110 follows the steps of the flow diagram 400 of FIG. 7A, broadcasting a Bluetooth LE ADV_IND or ADV_SCAN_IND PDU advertising packet seeking to discover a NAN ID available from another device having a NAN ID specified in the AdvA field of the ADV_IND/ADV_SCAN_IND PDU. The Bluetooth LE wireless device 110, functioning as an advertiser, receives a response to the advertising packet, by receiving a wireless, discovery request packet, such as a Bluetooth LE SCAN_REQ PDU, indicating an available NAN network identified by the NAN ID. The received wireless discovery request packet includes the NAN ID indication associated with the NAN ID available in the sender in the sender's address field, such as the ScanA field. In response to receiving the wireless discovery request packet, the Bluetooth LE wireless device 110 functioning as an advertiser, may filter the received NAN ID indication in the SCAN_REQ PDU to determine whether there is any match of the received NAN ID indication with one or more NAN network identities of required NAN IDs. The Bluetooth LE wireless device 110, functioning as an advertiser, transmits a wireless discovery response packet, such as a Bluetooth LE SCAN_RSP PDU, in response to the received wireless discovery request packet, including the NAN ID indication on which the match occurred, if the filtering determines that there is a match.

The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 402 inserting, by an apparatus, an indication associated with a required neighbor awareness network to an apparatus address field of a wireless advertisement packet (for example an ADV_IND PDU advertisement packet);

Step 404: transmitting, by the apparatus, the wireless advertisement packet including the inserted indication associated with the required neighbor awareness network;

Step 406: receiving, by the apparatus, one or more wireless discovery request packets (for example, a SCAN_REQ PDU discovery request packet) in response to the transmitted wireless advertisement packet;

Step 408: determining, by the apparatus, whether any of the received wireless discovery request packets matches with one or more required neighbor awareness networks by filtering sender address field indication of each of the received one or more wireless discovery request packets with neighbor awareness network identities corresponding with the one or more required neighbor awareness networks; and Step 410: transmitting, by the apparatus, a wireless discovery response packet (for example, a SCAN_RSP PDU discovery response packet) in response to the received wireless discovery request packet including an indication associated with the neighbor awareness network on which the determination resulted a match.

FIG. 7C is an example flow diagram 450 of operational steps of the Bluetooth LE scanning device 100 operating in a NAN network or intending to operate in a NAN network. The device has previously buffered the NAN IDs of the NAN networks it has available or in which it intends to operate. The Bluetooth LE wireless device 100 filters and analyzes the AdvA field of the received ADV_IND or ADV_SCAN_IND PDU and determines whether there is any match with the buffered NAN IDs, for NAN discovery. If the filtering determines that there is a match, the Bluetooth LE wireless device 100 prepares a wireless discovery response packet, SCAN_REQ PDU, to be transmitted including the indication associated with the NAN ID on which the match occurred, in accordance with at least one embodiment of the present invention. The steps of the flow diagram represent computer code instructions stored in the RAM and/or ROM memory, which when executed by the central processing units (CPU) CPU1 and/or CPU2, carry out the functions of the example embodiments of the invention. The steps may be carried out in another order than shown and individual steps may be combined or separated into component steps. The flow diagram has the following steps:

Step 452: maintaining, by an apparatus, one or more neighbor awareness network identities of the apparatus has available or in which the apparatus intends to operate;

Step 454: receiving, by the apparatus, a wireless advertisement packet (for example, a ADV_IND PDU packet) including an indication in a sender address field of the wireless advertisement packet associated with a required neighbor awareness network by a source apparatus of the wireless advertisement packet;

Step 456: determining, by the apparatus, whether the required neighbor awareness network advertised in the received wireless advertisement packet matches with any of the one or more available neighbor awareness network by filtering the sender address field indication of the received wireless advertisement packet with the maintained one or more neighbor awareness network identities;

Step 458: transmitting, by the apparatus, a wireless discovery request packet (for example, a SCAN_REQ PDU packet), including an indication associated with the neighbor awareness network on which the determination resulted in a match; and Step 460: waiting, by the apparatus, for a wireless response packet (for example, a SCAN_RSP PDU packet) including the indication associated with the advertised neighbor awareness network on which the match occurred.

The wireless advertisement packet may comprise either a Bluetooth Low Energy ADV_IND PDU packet or a Bluetooth Low Energy ADV_SCAN_IND PDU packet.

The sender address field may be a non-resolvable private address format in an AdvA field of either the Bluetooth Low Energy ADV_IND PDU packet or the Bluetooth Low Energy ADV_SCAN_IND PDU packet.

After filtering the NAN ID in the address field with the stored NAN ID values, if there is a match either in the advertiser or in the scanner, the apparatus may consider the match as an indication of need for further action, for example, activation of Wi-Fi NAN for publishing or subscribing purposes.

Operational steps of the Bluetooth LE advertising device 110 seeking a NAN network, comprise:

inserting, by an apparatus, an indication associated with a required neighbor awareness network to an apparatus address field of a wireless advertisement packet; and transmitting, by the apparatus, the wireless advertisement packet including the inserted indication associated with the required neighbor awareness network.

Operational steps of the Bluetooth LE advertising device 110 operating as a NAN subscriber, comprise:

inserting, by an apparatus, an indication associated with a required neighbor awareness network to an apparatus address field of a wireless advertisement packet;

transmitting, by the apparatus, the wireless advertisement packet including the inserted indication associated with the required neighbor awareness network;

receiving, by the apparatus, one or more wireless discovery request packets in response to the transmitted wireless advertisement packet;

determining, by the apparatus, whether any of the received wireless discovery request packets matches with one or more required neighbor awareness network by filtering sender address field indication of each of the received one or more discovery wireless request packets with neighbor awareness network identities corresponding with the one or more required neighbor awareness network; and transmitting, by the apparatus, a wireless discovery response packet in response to the received wireless discovery request packet including an indication associated with the neighbor awareness network on which the determination resulted a match.

Operational steps of the Bluetooth LE scanning device 100 indicating availability of a NAN network or intention to operate in a NAN network, comprise:

maintaining, by an apparatus, one or more neighbor awareness network identities of the apparatus has available or in which it intends to operate;

receiving, by the apparatus, a wireless advertisement packet including an indication in a sender address field of the wireless advertisement packet associated with a required neighbor awareness network by a source apparatus of the wireless advertisement packet;

determining, by the apparatus, whether the required neighbor awareness network advertised in the received wireless advertisement packet matches with any of the one or more available neighbor awareness network by filtering the sender address field indication of the received wireless advertisement packet with the maintained one or more neighbor awareness network identities;

transmitting, by the apparatus, a wireless discovery request packet, including an indication associated with the neighbor awareness network on which the determination resulted a match; and waiting, by the apparatus, for a wireless response packet including the indication associated with the advertised neighbor awareness network on which the match occurred.

FIG. 8 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment of the invention.

Although specific example embodiments have been disclosed, a person skilled in the art will understand that changes can be made to the specific example embodiments without departing from the spirit and scope of the invention.

What is claimed is:

1. A method, comprising:

inserting, by an apparatus, an indication associated with a neighbor awareness network to be advertised to an apparatus address field of a Bluetooth Low Energy advertisement packet; and transmitting, by the apparatus, the Bluetooth Low Energy advertisement packet including the inserted indication associated with the neighbor awareness network to be advertised.

2. The method of claim 1, further comprising:

receiving, by the apparatus, one or more wireless discovery request packets in response to the transmitted Bluetooth Low Energy advertisement packet;

determining, by the apparatus, whether any of the received wireless discovery request packets matches with the advertised neighbor awareness network by filtering sender address field indication of each of the received one or more wireless discovery request packets with the identity corresponding with the advertised neighbor awareness network; and transmitting, by the apparatus, a wireless discovery response packet in response to the received wireless discovery request packet, including the indication associated with the neighbor awareness network.

3. A method, comprising:

inserting, by an apparatus, an indication associated with a neighbor awareness network to be advertised to an apparatus address field of a wireless advertisement packet; and transmitting, by the apparatus, the wireless advertisement packet including the inserted indication associated with the neighbor awareness network to be advertised;

wherein the apparatus address field is a non-resolvable private address format in an AdvA field of either the Bluetooth Low Energy ADV_IND PDU packet or the Bluetooth Low Energy ADV_SCAN_IND PDU packet.

4. A method, comprising:

maintaining, by an apparatus, an indication of neighbor awareness network in which the apparatus wishes to operate;

receiving, by the apparatus, a Bluetooth Low Energy advertisement packet including an indication in a sender address field of the advertisement packet associated with a neighbor awareness network available in a source apparatus of the Bluetooth Low Energy advertisement packet;

determining, by the apparatus, whether the neighbor awareness network indicated available in the received Bluetooth Low Energy advertisement packet matches with a neighbor awareness network in which the apparatus wishes to operate by filtering the sender address field indication of the received Bluetooth Low Energy advertisement packet with the maintained neighbor awareness network indication; and transmitting, by the apparatus, a wireless discovery request packet, including an indication associated with the neighbor awareness network in which the apparatus wishes to operate when the determination resulted in a match.

5. The method of claim 4, further comprising:

waiting, by the apparatus, for a wireless discovery response packet including the indication associated with the available neighbor awareness network on which the match occurred.

6. A method, comprising:

maintaining, by an apparatus, an indication of neighbor awareness network in which the apparatus wishes to operate;

receiving, by the apparatus, a wireless advertisement packet including an indication in a sender address field of the advertisement packet associated with a neighbor awareness network available in a source apparatus of the wireless advertisement packet;

determining, by the apparatus, whether the neighbor awareness network indicated available in the received wireless advertisement packet matches with a neighbor awareness network in which the apparatus wishes to operate by filtering the sender address field indication of the received wireless advertisement packet with the maintained neighbor awareness network indication; and transmitting, by the apparatus, a wireless discovery request packet, including an indication associated with the neighbor awareness network in which the apparatus wishes to operate when the determination resulted in a match;

wherein the wireless advertisement packet is a Bluetooth Low Energy ADV_IND PDU packet or a Bluetooth Low Energy ADV_SCAN_IND PDU packet and the sender address field of the wireless advertisement packet is a non-resolvable private address format in an AdvA field of either the Bluetooth Low Energy ADV_IND PDU packet or the Bluetooth Low Energy ADV_SCAN_IND PDU packet.

7. A method, comprising:

maintaining, by an apparatus, an indication of neighbor awareness network in which the apparatus wishes to operate;

receiving, by the apparatus, a wireless advertisement packet including an indication in a sender address field of the advertisement packet associated with a neighbor awareness network available in a source apparatus of the wireless advertisement packet;

determining, by the apparatus, whether the neighbor awareness network indicated available in the received wireless advertisement packet matches with a neighbor awareness network in which the apparatus wishes to operate by filtering the sender address field indication of the received wireless advertisement packet with the maintained neighbor awareness network indication; and transmitting, by the apparatus, a wireless discovery request packet, including an indication associated with the neighbor awareness network in which the apparatus wishes to operate when the determination resulted in a match;

wherein the wireless discovery request packet is a SCAN_REQ PDU packet and the indication associated with the neighbor awareness network on which the determination resulted a match is non-resolvable private address format in a ScanA field of the SCAN_REQ PDU packet.

8. An apparatus, comprising:

at least one processor;

at least one memory including computer program code;

the at least one memory and the computer program code configured to, with the at least one processor, cause the apparatus at least to:

insert an indication associated with a neighbor awareness network to be advertised to an apparatus address field of a Bluetooth Low Energy advertisement packet; and transmit the Bluetooth Low Energy advertisement packet including the inserted indication associated with the neighbor awareness network to be advertised.

9. The apparatus of claim 8, further comprising:

the at least one memory and the computer program code configured to, with the at least one processor, cause the apparatus at least to:

receive one or more wireless discovery request packets in response to the transmitted Bluetooth Low Energy advertisement packet;

determine whether any of the received wireless discovery request packets matches with the advertised neighbor awareness network by filtering sender address field indication of each of the received one or more wireless discovery request packets with the identity corresponding with the advertised neighbor awareness network; and transmit a wireless discovery response packet in response to the received wireless discovery request packet, including the indication associated with the neighbor awareness network.

10. An apparatus, comprising:

at least one processor;

at least one memory including computer program code;

the at least one memory and the computer program code configured to, with the at least one processor, cause the apparatus at least to:

insert an indication associated with a neighbor awareness network to be advertised to an apparatus address field of a wireless advertisement packet; and transmit the wireless advertisement packet including the inserted indication associated with the neighbor awareness network to be advertised;

wherein the apparatus address field is a non-resolvable private address format in an AdvA field of either the Bluetooth Low Energy ADV_IND PDU packet or the Bluetooth Low Energy ADV_SCAN_IND PDU packet.

11. An apparatus, comprising:

at least one processor;

at least one memory including computer program code;

the at least one memory and the computer program code configured to, with the at least one processor, cause the apparatus at least to:

maintain an indication of a neighbor awareness network in which the apparatus wishes to operate;

receive a Bluetooth Low Energy advertisement packet including an indication in a sender address field of the advertisement packet associated with a neighbor awareness network available in a source apparatus of the advertisement packet;

determine whether the neighbor awareness network indicated available in the received Bluetooth Low Energy advertisement packet matches with the neighbor awareness network in which the apparatus wishes to operate by filtering the sender address field indication of the received Bluetooth Low Energy advertisement packet with the maintained neighbor awareness network indication; and transmit a wireless discovery request packet, including an indication associated with the neighbor awareness network in which the apparatus wishes to operate when the determination resulted in a match.

12. The apparatus of claim 11, further comprising:

the at least one memory and the computer program code configured to, with the at least one processor, cause the apparatus at least to:

wait for a wireless discovery response packet including the indication associated with the available neighbor awareness network on which the match occurred.

13. An apparatus, comprising:

at least one processor;

at least one memory including computer program code;

the at least one memory and the computer program code configured to, with the at least one processor, cause the apparatus at least to:

maintain an indication of a neighbor awareness network in which the apparatus wishes to operate;

receive a wireless advertisement packet including an indication in a sender address field of the advertisement packet associated with a neighbor awareness network available in a source apparatus of the advertisement packet;

determine whether the neighbor awareness network indicated available in the received wireless advertisement packet matches with the neighbor awareness network in which the apparatus wishes to operate by filtering the sender address field indication of the received wireless advertisement packet with the maintained neighbor awareness network indication; and transmit a wireless discovery request packet, including an indication associated with the neighbor awareness network in which the apparatus wishes to operate when the determination resulted in a match;

wherein the wireless advertisement packet is a Bluetooth Low Energy ADV_IND PDU packet or a Bluetooth Low Energy ADV_SCAN_IND PDU packet and the sender address field of the wireless advertisement packet is a non-resolvable private address format in an AdvA field of either the Bluetooth Low Energy ADV_IND PDU packet or the Bluetooth Low Energy ADV_SCAN_IND PDU packet.

14. An apparatus, comprising:
at least one processor;
at least one memory including computer program code;
the at least one memory and the computer program code configured to, with the at least one processor, cause the apparatus at least to:
maintain an indication of a neighbor awareness network in which the apparatus wishes to operate;
receive a wireless advertisement packet including an indication in a sender address field of the advertisement packet associated with a neighbor awareness network available in a source apparatus of the advertisement packet;
determine whether the neighbor awareness network indicated available in the received wireless advertisement packet matches with the neighbor awareness network in which the apparatus wishes to operate by filtering the sender address field indication of the received wireless advertisement packet with the maintained neighbor awareness network indication; and
transmit a wireless discovery request packet, including an indication associated with the neighbor awareness network in which the apparatus wishes to operate when the determination resulted in a match;
wherein the wireless discovery request packet is a $SCAN_{13}$ REQ PDU packet and the indication associated with the neighbor awareness network on which the determination resulted a match is a non-resolvable private address format in in a ScanA field of the $SCAN_{13}$ REQ PDU packet.

15. A computer program product comprising computer executable program code recorded on a computer readable non-transitory storage medium, the computer executable program code comprising:
code for inserting, by an apparatus, an indication associated with a neighbor awareness network to be advertised to an apparatus address field of a Bluetooth Low Energy advertisement packet; and
code for transmitting, by the apparatus, the Bluetooth Low Energy advertisement packet including the inserted indication associated with the neighbor awareness network to be advertised.

16. The computer program product of claim 15, further comprising:
code for receiving, by the apparatus, one or more wireless discovery request packets in response to the transmitted Bluetooth Low Energy advertisement packet;
code for determining, by the apparatus, whether any of the received wireless discovery request packets matches with the advertised neighbor awareness network by filtering sender address field indication of each of the received one or more wireless discovery request packets with the identity corresponding with the advertised neighbor awareness network; and
code for transmitting, by the apparatus, a wireless discovery response packet in response to the received wireless discovery request packet, including the indication associated with the neighbor awareness network.

17. A computer program product comprising computer executable program code recorded on a computer readable non-transitory storage medium, the computer executable program code comprising:
code for maintaining, by an apparatus, an indication of a neighbor awareness network in which the apparatus wishes to operate;
code for receiving, by the apparatus, a Bluetooth Low Energy advertisement packet including an indication in a sender address field of the advertisement packet associated with a neighbor awareness network available in a source apparatus of the Bluetooth Low Energy advertisement packet;
code for determining, by the apparatus, whether the neighbor awareness network indicated available in the received Bluetooth Low Energy advertisement packet matches with a neighbor awareness network in which the apparatus wishes to operate by filtering the sender address field indication of the received Bluetooth Low Energy advertisement packet with the maintained neighbor awareness network indication; and
code for transmitting, by the apparatus, a wireless discovery request packet, including an indication associated with the neighbor awareness network in which the apparatus wishes to operate when the determination resulted in a match.

18. The computer program product of claim 17, further comprising:
code for waiting, by the apparatus, for a wireless discovery response packet including the indication associated with the available neighbor awareness network on which the match occurred.

* * * * *